(12) United States Patent
Foner

(10) Patent No.: US 10,156,310 B2
(45) Date of Patent: Dec. 18, 2018

(54) NON-SPILL CONNECT UNDER PRESSURE COUPLER

(71) Applicant: Parker-Hannifin Corporation, Cleveland, OH (US)

(72) Inventor: Brian Keith Foner, Saint Louis Park, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 61 days.

(21) Appl. No.: 15/262,762

(22) Filed: Sep. 12, 2016

(65) Prior Publication Data

US 2017/0138522 A1 May 18, 2017

Related U.S. Application Data

(60) Provisional application No. 62/256,878, filed on Nov. 18, 2015.

(51) Int. Cl.
*F16L 37/34* (2006.01)
*F16L 55/07* (2006.01)
*F16L 37/32* (2006.01)

(52) U.S. Cl.
CPC ............. *F16L 37/34* (2013.01); *F16L 37/32* (2013.01); *F16L 55/07* (2013.01)

(58) Field of Classification Search
CPC ............ F16L 37/34; F16L 55/07; F16L 37/32
USPC .......... 137/614.03–614.05; 251/149.1, 149.6
See application file for complete search history.

(56) References Cited

U.S. PATENT DOCUMENTS

| 4,350,321 A | 9/1982 | Berg |
| 4,373,551 A | 2/1983 | Shindelar |
| 4,549,577 A | 10/1985 | Kugler |
| 4,564,042 A | 1/1986 | Ekman |
| 4,598,896 A | 7/1986 | Maldavs |

(Continued)

FOREIGN PATENT DOCUMENTS

| EP | 2 615 350 A1 | 7/2013 |
| WO | 98/34459 A1 | 8/1998 |

(Continued)

OTHER PUBLICATIONS

European Search Report dated Mar. 20, 2017, for corresponding European Application No. 16194651.2.

*Primary Examiner* — Kevin Lee
(74) *Attorney, Agent, or Firm* — Renner, Otto, Boisselle & Sklar, LLP

(57) ABSTRACT

A quick connect/disconnect coupling having a female coupler and a corresponding male coupler. The female coupler has a non-spill configuration and includes a housing and a valve body slidably movable in the housing. A valve member is slidably movable in the valve body toward and away from a valve seat, the valve member being configured to engage the male coupler. A piston is interposed between a main cavity and a trap chamber of the female coupler. The piston may be fixed to the valve member for common movement, and may include an internal flow passage for enabling fluid connection between the main cavity and trap chamber. A check valve may allow fluid flow from the trap chamber to the main cavity when the trap chamber pressure is greater than the main cavity pressure. A locking collar may be independently movable of the valve body to reduce the force required to connect the couplers.

20 Claims, 19 Drawing Sheets

(56) References Cited

U.S. PATENT DOCUMENTS

| | | |
|---|---|---|
| 4,881,573 A | 11/1989 | Durant et al. |
| 5,884,897 A | 3/1999 | Arosio |
| 5,918,633 A | 7/1999 | Zeiber |
| 5,937,899 A | 8/1999 | Zeiber |
| 6,016,835 A | 1/2000 | Maldavs |
| 6,024,124 A | 2/2000 | Braun et al. |
| 6,026,857 A | 2/2000 | Stucchi |
| 6,095,190 A | 8/2000 | Wilcox et al. |
| 6,116,277 A | 9/2000 | Wilcox et al. |
| 6,145,539 A | 11/2000 | Wilcox et al. |
| 6,283,151 B1 | 9/2001 | Countryman et al. |
| 6,405,815 B1 | 6/2002 | Stoever et al. |
| 6,588,806 B2 | 7/2003 | Arosio |
| 6,655,656 B2 | 12/2003 | Maldavs |
| 6,659,130 B2 | 12/2003 | Arosio |
| 6,675,833 B2 | 1/2004 | Maldavs |
| 6,776,187 B1 | 8/2004 | Marquis et al. |
| 6,814,340 B2 | 11/2004 | Arosio |
| 6,830,059 B1 | 12/2004 | Zeiber et al. |
| 6,840,276 B2 | 1/2005 | Zeiber et al. |
| 6,926,031 B2 | 8/2005 | Zeiber et al. |
| 7,007,983 B2 | 3/2006 | Arosio |
| 7,568,502 B2 | 8/2009 | Marquis |
| 7,815,169 B2 | 10/2010 | Arosio |
| 8,567,436 B2 | 10/2013 | Polgati et al. |
| 8,726,936 B2 | 5/2014 | Rusconi et al. |
| 9,291,293 B2 * | 3/2016 | Prust et al. ............ F16L 37/34 |
| 2011/0254265 A1 | 10/2011 | Rusconi |
| 2012/0175000 A1 | 7/2012 | Rusconi et al. |
| 2012/0181465 A1 | 7/2012 | Rusconi |

FOREIGN PATENT DOCUMENTS

| | | |
|---|---|---|
| WO | 2014/003695 A1 | 1/2014 |
| WO | 2015/067794 A1 | 5/2015 |

\* cited by examiner

NON-SPILL CONNECT UNDER PRESSURE COUPLER

RELATED APPLICATIONS

This application claims the benefit of U.S. Provisional Application No. 62/256,878 filed Nov. 18, 2015, which is hereby incorporated herein by reference in its entirety.

FIELD OF INVENTION

The present invention relates generally to quick connect/disconnect couplings and, more particularly, to a non-spill female coupler for pressurized fluid lines.

BACKGROUND

Quick connect couplings are used, for example, to connect hoses in hydraulic fluid lines. A typical application is on agricultural tractors to connect the tractor hydraulic system with attachable implements. The tractor typically includes one or more female coupler sockets, while the implements include one or more male coupler nipples.

Over the years changes have occurred in these systems which have required changes and performance improvements in the couplings. It is typically desirable for these couplings to connect regardless of trapped pressures within either the male or female side. It is also typically desirable for these couplings to connect without excessive leakage of fluid during attachment or detachment.

One known coupling design that attempts to address such issues is WO 2015/067794, which discloses a non-spill female coupler of a flat face design having an inner assembly axially sliding inside an outer assembly, and a seal adapted to generate a pressure difference between an incoming supply line and a chamber at the rear of the inner assembly. The seal includes a deformable portion and a non-deformable portion, and is adapted to open and close a communication pipe between the supply line and the rear chamber so as to introduce pressure to the rear chamber, but prevent flow in the reverse direction from the rear chamber toward the supply line. However, preventing reverse flow in this way can cause problems when the fluid in the rear chamber is trapped and pressure of this trapped fluid increases due to temperature or other factors. For example, the pressure trapped in the rear chamber may increase excessively due to such factors, and without a user manually relieving the pressure in the rear chamber to a rear drain line, there is no other mechanism to relieve such pressure, which may lead to catastrophic failure of the coupler.

The known coupler referenced above also includes a rigidly mounted locking member that is fixed to the valve body, such that the entire valve body must shift a sufficient distance for the locking elements to lock into place during connection with the male coupler. However, such a configuration causes problems of increased connection force because it requires the user to exert enough force to overcome a centering spring and move the entire valve body far enough that the locking elements can lock into place. The configuration of the known coupler may also have problems with a non-connect range in which the interface pressure at the coupling is higher than the centering spring force, which may prevent the coupling from being able to lock.

SUMMARY OF INVENTION

The present invention provides, inter alia, a coupler that enables safe connect or disconnect under pressure, while providing minimal spillage of the operating fluid during the coupling or uncoupling, and which overcomes one or more disadvantages of known couplers such as the type described above.

More particularly, according to one aspect of the invention, a female coupler may have a non-spill interface configured to cooperate with the male coupler to minimize spillage of operating fluid.

The female coupler may have a valve member and a piston fixed to the valve member that enables common movement of both within a valve body. The piston may be interposed between a main cavity on one side of the piston and a trap chamber on an opposite side of the piston.

The piston may include an internal flow passage extending through the piston to enable fluid flow to and from the main cavity and the trap chamber.

Such a configuration of the piston may enable improved control over the fluid pressure in the trap chamber. For example, such a configuration may enable pressurized fluid to enter the trap chamber behind the piston for energizing the piston and intensifying the force on the valve member. Such a configuration may also enable pressurized fluid to escape from the trap chamber to prevent over-pressurization.

In some embodiments, the internal flow passage extending through the piston may be configured such that a pressure drop occurs across the piston as fluid flows from the main cavity through the trap chamber, which enables the piston to shift in response to the pressure differential created on opposite sides of the piston.

In some embodiments, the internal flow passage through the piston may be configured such that if fluid is trapped in the trap chamber and the fluid pressure in the trap chamber becomes incrementally greater than the fluid pressure on the opposite side of the piston, then fluid flow may pass from the trap chamber through the internal flow passage to the opposite side of the piston so as to enable a reduction of the fluid pressure in the trap chamber.

According to another aspect of the invention, a female coupler may include a check valve configured to allow fluid flow from a trap chamber on one side of a piston in the valve body to a main cavity on an opposite side of the piston in the valve body. The check valve may be configured to open the flow path from the trap chamber to the main cavity when the pressure in the trap chamber exceeds the pressure in the main cavity.

Such a configuration may enable the fluid pressure in the trap chamber to be automatically relieved, which may prevent catastrophic failure of the coupler due to excessive pressure in the trap chamber.

In some embodiments, the check valve may be provided by a valve member sealingly engaged to an annular seal carried by the piston, where the piston has a through-passage fluidly connecting the trap chamber with the main cavity. In this manner, when the check valve is activated, the fluid may flow from the trap chamber through the piston internal flow passage to the main cavity to enable a reduction in fluid pressure in the trap chamber.

According to yet another aspect of the invention, a female coupler may include a locking collar that is axially movable and forwardly biased toward an opening of the female coupler, where the axial movement of the locking collar during coupling with a male coupler is independent of the movement of valve body.

In such a configuration, the valve body may not be required to move substantially for the locking to occur, which may reduce the force required by the user to lock the male coupler with the female coupler, thereby further improving the connect under pressure operation. Such a configuration may also prevent a non-connect range which is a problem of some known couplers of the type described above.

In some embodiments, the locking collar may cooperate with a face sleeve, such that the face sleeve is operative to support at least one locking element at an unlock position when the face sleeve is in a forward position, and when the face sleeve is urged rearwardly in response to insertion of the male coupler, the face sleeve unsupports the locking element, enabling the locking collar to urge the locking element into a locking groove of the male coupler and thereafter holding the locking element in a locking position.

According to an aspect of the invention, a non-spill female coupler for quick connect/disconnect coupling with a corresponding male coupler, includes: a housing having an internal bore with an open forward end configured to receive the male coupler, and a supply passage for supplying pressurized fluid to the internal bore; a valve body slidably movable in the internal bore, the valve body defining an internal main cavity that opens to the forward end of the internal bore, and an inlet passage through the valve body for communicating the pressurized fluid from the supply passage to the main cavity; a valve member slidably movable in the valve body toward and away from a valve seat, the valve member having a front face configured to engage a corresponding front face of the male coupler; and a piston fixed to the valve member for common movement, the piston being interposed between the main cavity on one side of the piston and a trap chamber on an opposite side of the piston; wherein the piston includes an internal flow passage extending through the piston to enable fluid connection of the main cavity with the trap chamber.

According to another aspect of the invention, a non-spill female coupler for quick connect/disconnect coupling with a corresponding male coupler, includes: a housing having an internal bore with an open forward end configured to receive the male coupler, and a supply passage for supplying pressurized fluid to the internal bore; a hydrostatically balanced valve body slidably movable in the internal bore, the valve body defining a main cavity that opens to the forward end of the housing internal bore, and an inlet passage through the valve body for communicating the pressurized fluid from the supply passage to the main cavity; a valve member slidably movable in the valve body toward and away from a valve seat, the valve member having a front face configured to engage a corresponding front face of the male coupler; an unbalanced piston interposed between the main cavity and a trap chamber rearward of the piston, the unbalanced piston configured to move the valve member within the valve body; and a locking collar toward the open forward end of the internal bore, the locking collar being axially movable in a collar chamber between locking and release positions; wherein a spring is configured to bias the locking collar forwardly such that the axial movement of the locking collar during the coupling of the male coupler is independent of the movement of valve body.

According to another aspect of the invention, a non-spill female coupler for quick connect/disconnect coupling with a corresponding male coupler, includes: a housing having an internal bore with an open forward end configured to receive the male coupler, and a supply passage for supplying pressurized fluid to the internal bore; a valve body slidably movable in the internal bore, the valve body defining an internal main cavity that opens to the forward end of the internal bore, and an inlet passage through the valve body for communicating the pressurized fluid from the supply passage to the main cavity; a valve member slidably movable in the valve body toward and away from a valve seat, the valve member having a front face configured to engage a corresponding front face of the male coupler; a piston fixed to the valve member for common movement, the piston being interposed between the main cavity on one side of the piston and a trap chamber on an opposite side of the piston; and a check valve configured to allow fluid flow from the trap chamber to the main cavity when the pressure in the trap chamber is greater than the pressure in the main cavity.

Such configuration(s) of the female coupler may provide, inter alia, an improved non-spill coupling that can safely and easily connect under pressure without movement of a load attachment connected to the coupling.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles of the present invention have particular application to quick-disconnect couplings, including a female coupler, or socket, and a corresponding male coupler, or nipple. The female coupler may be a casting mounted coupler, or cartridge, that may be used to connect the hydraulic system of an agricultural tractor with attachable implements, and thus will be chiefly described in this context. However, those skilled in the art will appreciate that the coupling may be used in other applications where it is desirable to provide safe connect or disconnect under pressure, while providing minimal spillage of operating fluid during the coupling or uncoupling between the couplers.

Figure 1:
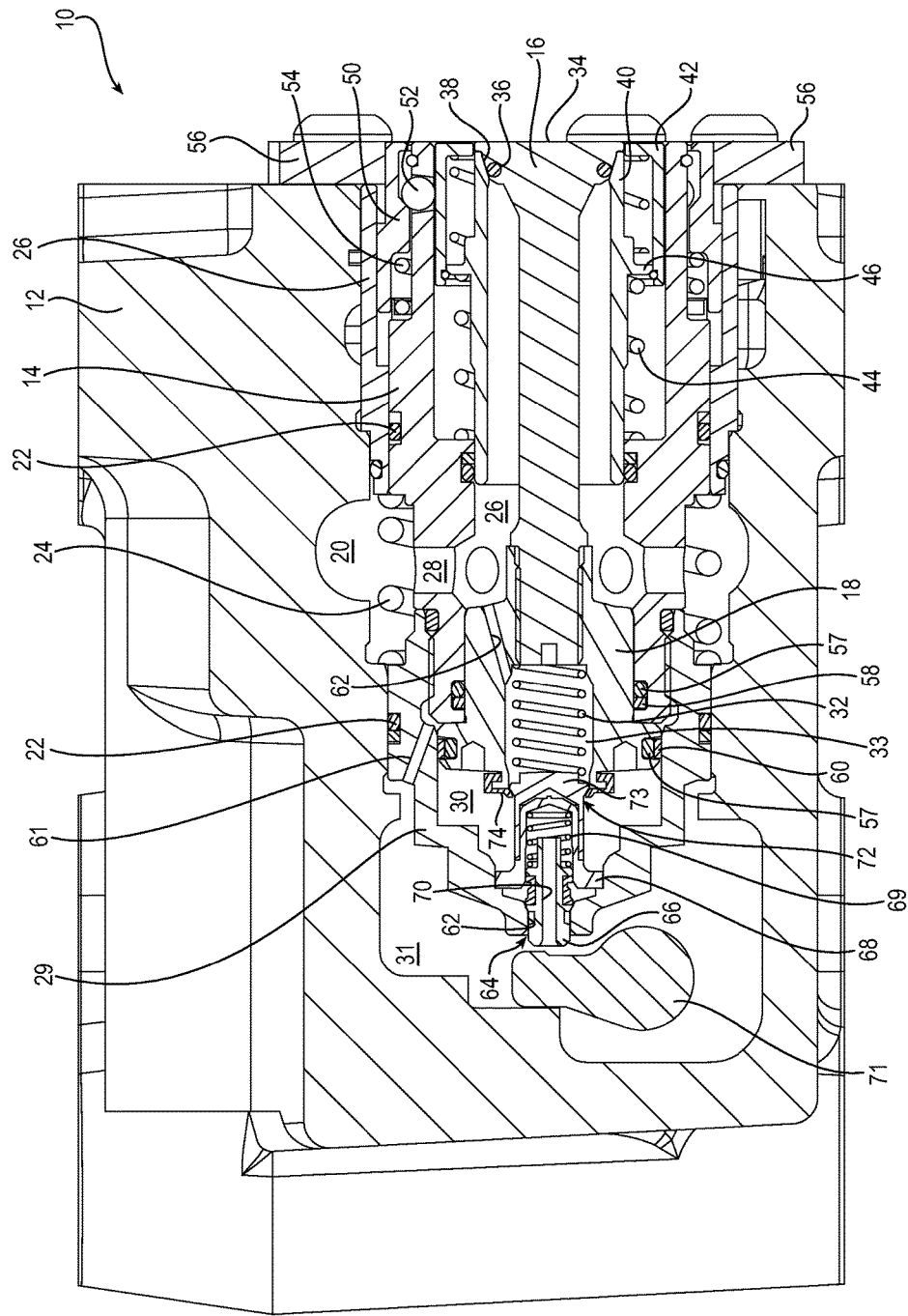
FIG. 1 is a cross-sectional side view of an exemplary female coupler according to an embodiment of the invention.

In the discussion above and to follow, the terms "upper", "lower", "top", "bottom," "end," "inner," "left," "right," "forward," "rearward," "horizontal," "vertical," etc. refer to an exemplary female coupler as viewed in a horizontal position, as shown in FIG. 1, for example. This is done realizing that these devices, such as when used on vehicles, can be mounted on the top, bottom, or sides of other components, or can be inclined with respect to the vehicle chassis, or can be provided in various other positions. It is understood that the foregoing terminology, or terminology of similar import, is used for purposes of convenience rather than in any limiting sense.

Turning to FIG. 1, an exemplary female coupler 10 for an exemplary quick connect-disconnect coupling is shown. The female coupler 10 generally includes a housing 12, a valve body 14 slidably movable in the housing 12, a valve member 16 slidably moveable in the valve body 14, and a piston 18 configured to assist in movement of the valve member 16 within the vale body 14.

As shown in the illustrated embodiment, the housing 12 may be a casting that is part of an agricultural tractor, for example. The housing 12 may include an internal bore with an open forward end configured to receive a corresponding male coupler, and a supply passage 20 for supplying pressurized fluid to the internal bore. It is understood that although the housing 12 is shown as a casting, the housing 12 may be provided as a standalone unit apart from the tractor, for example.

The valve body 14 is axially movable in the internal bore of the housing 12, and a centering spring 24 may be disposed in the housing 12 to center the valve body 14 in the internal bore. A radially outer sleeve 26, which may be formed from one or more parts, may surround a forward portion of the valve body 14, and engages the centering spring 24 to maintain the spring force. A pair of one or more seals 22 (such as an o-ring and a back-up ring, as shown) may be disposed at opposite portions of the valve body 14. The seals 22 may be in sealing contact at the same diameter within the internal bore such that fluid pressure acting on these seals 22 may cause the valve body to be hydrodynamically balanced in the housing 12. In this manner, the hydrodynamically balanced valve body 14 can translate forward and rearward in the housing 12 with only the force required for compressing the centering spring 24, even when the coupler 10 is fully pressurized.

The valve body 14 defines at least a portion of an internal main cavity 26 that opens to the forward end of the internal bore, and an inlet passage 28 through the valve body 14 for communicating the pressurized fluid from the supply passage 20 to the main cavity 26. A rearward portion 29 of the valve body may be fixed to a forward portion of the valve body 14, such as with threads. The rearward portion of the valve body 29, in combination with the piston 18, may be configured to define at least a portion of a trap chamber 30 located behind the piston 18. A low pressure chamber 31 may be located behind the valve body 14 opposite the trap chamber 30. The low pressure chamber 31 may be an outlet passage that is fluidly connected to a low-pressure line that may be fluidly connected to a sump, reservoir or tank. The pressure level of the low pressure chamber 31, or outlet passage, may be less than the trap chamber or main cavity pressures, such as at about atmospheric pressure, or up to 2 bar or less.

The valve member 16 may be fixed to the piston 18 such that they both move together forward and rearward within the valve body 14. The piston 18 may be fixed to the valve member 16 by removable attachment (such as with threads, fasteners, or the like), permanent attachment (such as with a weld, or the like), or may be integrally formed together as a unitary member. At least one spring 32 may be disposed toward a rearward end of the piston 18 for biasing the piston 18 and valve member 16 in a forward direction, and the piston 18 may have one or more abutments that engage the valve body 14 for retaining the piston 18 and valve member 16 within the valve body. The spring 32 may be disposed in a spring chamber 33 that is at least partially defined by the piston 18.

Figure 2:
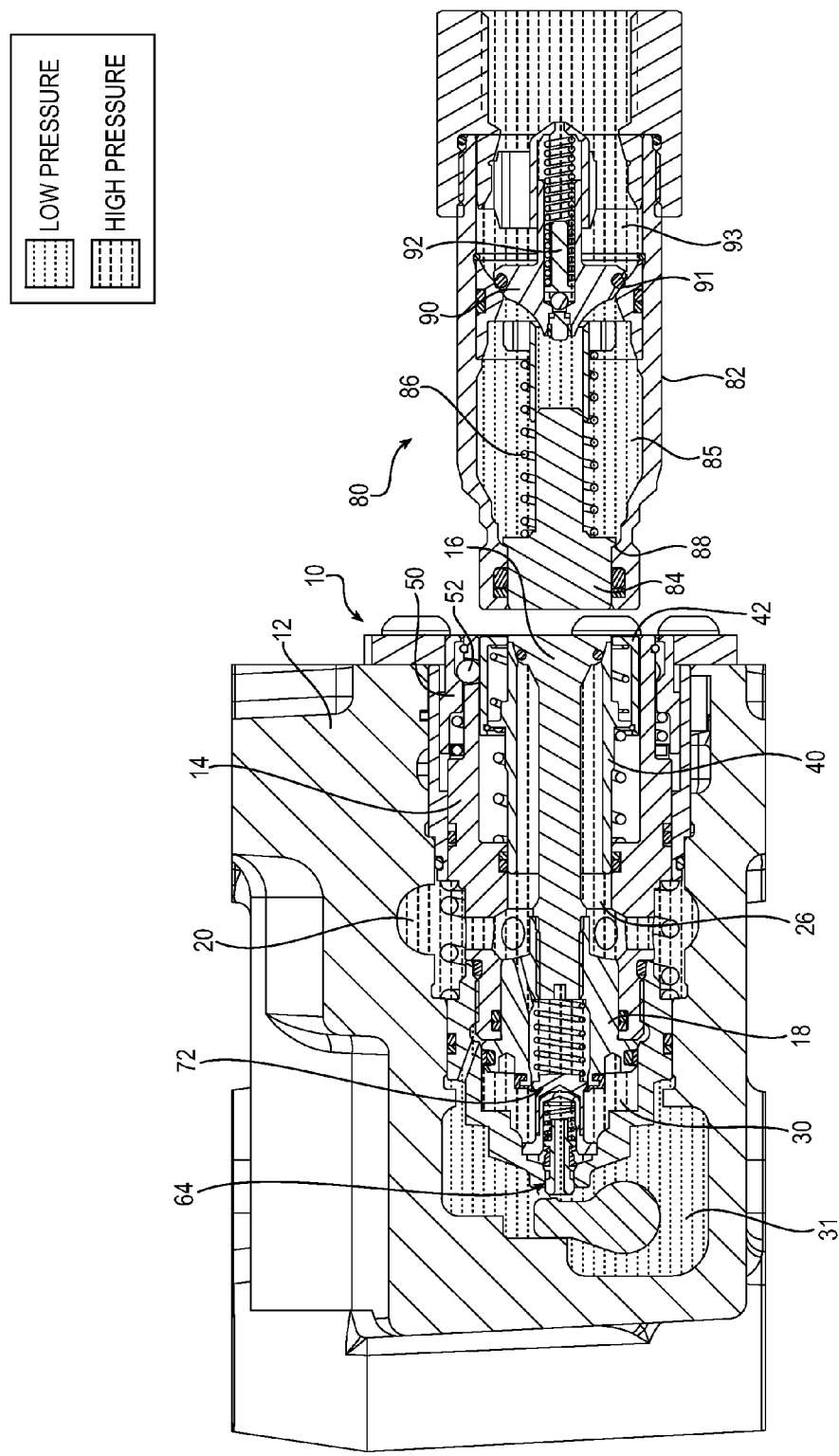
FIGS. 2-9 are a sequence of cross-sectional side views showing various states of the female coupler in FIG. 1 being coupled to a corresponding male coupler, also shown in cross-section.

The valve member 16 may have a flat front face 34 configured to engage a corresponding flat front face of a male coupler (shown in FIG. 2). The valve member 16 may have an annular seal 36 rearward of the flat front face 34, and the valve member 16 is configured to sealingly engage a valve seat 38 for opening and closing the fluid flow path between the female coupler 10 and the corresponding male coupler. A sealing sleeve 40 may surround a forward portion of the valve member 16, and may define the valve seat 38. The sealing sleeve 40 may be axially movable relative to the valve member 16 to cooperate with sealing against the valve member 16 during the connect and disconnect sequence. In this manner, the valve member 16 and the sealing sleeve 40 may be configured to cooperate with each other to minimize spillage of the working fluid (e.g., hydraulic fluid) by providing full sealing contact of the respective surfaces before connection and disconnection, as will be discussed in further detail below.

A cylindrical face sleeve 42 may be radially outward of the sealing sleeve 40, and the face sleeve 42 may be axially moveable relative to the valve body 14. The face sleeve 42 may have a front face that is engageable with the front face of the male coupler, and the face sleeve 42 may be configured for being urged rearward when the male coupler is inserted into the female coupler 10. The sealing sleeve 40 may having a radially outward shoulder 46 that is engageable with the face sleeve 42. A sealing sleeve spring 44 may bias the sealing sleeve 40 toward the forward direction, and when the face sleeve 42 is urged rearward by the male coupler, the face sleeve 42 may engage the sealing sleeve shoulder 46 to also urge the sealing sleeve 40 rearward and compress the spring 44. As the male coupler is removed, the spring 44 may bias the sealing sleeve 40 and face sleeve 44 forward toward their normal positions.

A locking collar 50 may also be provided toward the open forward end of the internal bore. The locking collar 50 may be axially movable in a collar chamber between locking (e.g., forward) and release (e.g., rearward) positions. The locking collar 50 in its locking position may be operative to hold at least one locking element 52, such as a locking ball, at a locking position such that the locking element 52 protrudes radially inwardly for engaging the male coupler. The locking collar 50 in its release position may enable radial outward movement of the locking element 52 for disengagement from the male coupler. In exemplary embodiments, a spring 54 biases the locking collar 50 forwardly toward the locking position such that the axial movement of the locking collar 50 during coupling with male coupler is independent of the movement of valve body 14.

The locking collar 50 may cooperate with the face sleeve 42, such that the face sleeve 42 is operative to support the locking element 52 radially outwardly in an unlock position when the face sleeve 42 is in a forward position. When the face sleeve 42 is moved rearwardly to unsupport the locking element 52, the locking collar 50 is operative to move forwardly and urge the locking element 52 radially inwardly to engage and hold the male coupler.

One or more retaining members 56, such as a plate or the like, may be mounted to the housing 12 to prevent the locking collar 50 from forward movement beyond a certain point. As will be discussed in further detail below, when the male coupler is decoupled from the female coupler 10 in an emergency breakaway situation, the retaining member 56 may hold the locking collar 50 in a position that enables the locking member 52 to be urged radially outwardly such that the male coupler can be safely removed from the female coupler, even under pressure.

The piston 18 may be interposed between the main cavity 26 and the trap chamber 30 such that the piston 18 is exposed to fluid pressure in the main cavity 26 on one side of the piston, and is exposed to fluid pressure in the trap chamber 30 on the opposite side of the piston. In this manner, the piston 18 may be configured to carry the valve member 16 back and forth in response the hydraulic force differential between the fluid pressure in the trap chamber 30 and the fluid pressure in the main cavity 26. In exemplary embodiments, the piston 18 may be configured as an unbalanced piston having a pair of one or more seals (such as an o-ring 57, backup ring 58 and/or slipper seal 60) that seal the piston 18 at different diameters between the main cavity 26 and the trap chamber 30. An orifice 61 may extend through the rearward portion of the valve body 14 to fluidly connect the low pressure chamber 31 between the forward piston seal(s) (e.g., seals 57 and 58) and the rearward piston seal(s) (e.g., seals 57 and 60), which seal at the different diameters. By sealing the piston 18 at the different diameters in this way, a hydraulic force differential is created that unbalances the piston. For example, the unbalanced piston may provide for a force intensification on the side of the piston having the larger diameter seals due to the hydraulic pressure acting on the larger area.

The piston 18 may also include an internal flow passage 62 that extends through the piston to enable fluid flow between the main cavity 26 and the trap chamber 30, such as via the spring chamber 33. As discussed in further detail below, the internal flow passage 62 may enable improved control over pressures in the valve body depending on the operating state of the female coupler 10. For example, in some situations the internal flow passage 62 may enable pressurized fluid to flow from the main cavity 26 to the trap chamber 30 for energizing the piston 18 and intensifying the forward force on the valve member 16 to assist in opening a valve in the male coupler. In other situations, such as when fluid flows from the main cavity 26 through the trap chamber 30, the internal flow passage 62 may act as a fixed restriction orifice such that a pressure drop occurs across the piston 18, which may enable the piston 18 to shift in response to the pressure differential created on opposite sides of the piston 18. In still other situations, the internal flow passage 62 may enable pressurized fluid to escape from the trap chamber 30 into the main cavity 26 so as to prevent over-pressurization of the trap chamber 30.

The rearward portion of the valve body 14 may have a relief passage 62 for fluidly connecting the trap chamber 30 to the low pressure chamber 31, or outlet passage. A relief valve 64 may be provided to open or close the flow path through the relief passage 62. The relief valve 64 may include a valve spool 66 having sealing surfaces configured to sealingly engage with a sealing surface of the valve body 14. The valve spool 66 may be slidably disposed in a guide poppet 68, which may contain a spring 69 for biasing the valve spool 66 rearward against the valve body 14. The valve spool 66 also may be sealingly engaged to the guide poppet 68. The valve spool 66 may have an axial flow passage 70 that fluidly connects the low pressure chamber 31 across both sides of the sealing surfaces of the valve spool 66 such that the valve spool is hydrodynamically balanced. As discussed in further detail below, an actuator 71 may be configured to activate the relief valve 64, such that the actuator engages and unseats the valve spool 66 from the valve body 14 to open a flow path from the trap chamber 30 to the low pressure chamber 31, or outlet passage. The actuator 71 may be operatively connected to a lever disposed outside of the housing 12, which enables a user to manually activate the relief valve 64.

A second relief valve 72 also may be provided to open or close the flow path between the trap chamber 30 and the main cavity 26. In the illustrated embodiment, the second relief valve 72 includes a relief poppet 73 that sealingly engages with an annular trap seal 74 that is carried by the piston 18. Also as shown, the relief poppet 73 may include an internal bore in which the poppet guide 68 is disposed. As will be discussed in further detail below, when the first relief valve 64 is activated to open the fluid flow path flow from the trap chamber 30 to the low pressure chamber 31, the pressure in the trap chamber 30 may be reduced compared to the pressure in the main cavity 26, thereby enabling the piston 18 to shift rearwardly in response to the pressure differential. When the piston 18 shifts in this way, the relief poppet 73 of the second relief valve 72 may disengage from the trap seal 74 to open the flow path from the main cavity 26 to the trap chamber 30 via the internal flow passage 62 and spring chamber 33.

In exemplary embodiments, the second relief valve 72 may be biased against the trap seal 74 via the spring 69 to normally prevent flow from the main cavity 26 to the trap chamber 30 unless the first relief 64 has been activated to cause the piston 18 to shift, as discussed above. In this situation, when the flow path from the trap chamber 30 to the low pressure chamber 31 is closed and fluid in the trap chamber 30 is trapped, the relief valve 72 may be operable as a check valve that is configured to unseat from the trap seal 74 when the pressure in the trap chamber 30 exceeds a threshold pressure level, thereby opening the flow path from the trap chamber 30 to the main cavity 26 via the internal passage 62, so as to enable a decrease in the trap chamber pressure. The threshold pressure level may be set by the spring force of the at least one spring 32. Such an exemplary configuration of a relief valve 72 cooperating with a single trap seal 74 carried by the piston 18 provides a relief valve and/or check valve function for the female coupler 10 that is relatively simple and easy to manufacture.

Turning to FIGS. 2-9, the coupling operation of the exemplary quick coupling, including the exemplary female coupler 10 and a male coupler 80, will now be described in further detail. In the context of using the exemplary coupling on an agricultural tractor, for example, the female coupler 10 is typically mounted on the tractor and includes the supply passage 20 for connection of the female coupler 10 to a hydraulic supply hose or other fluid conveyance means on the tractor. The male coupler 80, which is typically mounted on an agricultural implement, such as plow or wing for example, is shown as a conventional, commercially-available male coupler.

Referring to FIG. 2, the female coupler 10 and the male coupler 80 are shown in their normal positions disconnected from each other. In the illustrate state, the female coupler contains relatively high pressure in the supply passage 20, in the main cavity 26, across the through-passage 62, into the chamber containing spring 32, and also in the trap chamber 30. The pressure level in the foregoing chambers, cavities and passages may be about the same, and the relatively high pressure may be caused by a residual charge pressure, or by increased temperature of the trapped hydraulic fluid, and not necessarily high-pressure due to full pump flow potential. The low pressure chamber 31, or outlet passage, which may be connected to sump or tank, remains at a relatively low pressure, such as at about atmospheric pressure, or lower. In the state shown, the female coupler 10 has the piston 18 in a forward position and the valve member 16 is seated against the valve seat 38. The face sleeve 42 and the sealing sleeve 40 are also forwardly biased to their forward positions. The face sleeve 42 supports the locking element 52 and holds the locking collar 52 in an unlock position. The actuator 71 is disengaged from the relief valve 64 such that the fluid pressure in the trap chamber 30 remains trapped behind the piston 18. In this state, the first relief valve 64 and the second relief valve 72 are both sealingly seated to close their respective flow paths.

The male coupler 80 includes an outer tubular housing 82, or nipple housing. The nipple housing 82 has an internal bore and a valve member 84 that is biased by a main spring 86 toward a closed position against a valve seat 88 at a forward end portion of the nipple housing. The valve member 84 has a flat front face configured to engage the flat front face 34 of the female coupler 10. A second valve member 90 is interposed between a front chamber 85 and a rear chamber 93. The second valve member 90 is configured to seat against a valve seat 91 and is configured to contain high fluid pressure in the rearward chamber 93 behind the valve member 90. The fluid pressure in the front chamber 85 may be at a relatively low pressure in the state shown. Optionally a third valve, such as a relief valve 92, may also be provided in a known-manner.

Still referring to the state shown in FIG. 2, it is noted that if the relatively high pressure trapped in the female coupler 10 exceeds a certain level, this may lead to complications during connection with the male coupler 80, or may lead to catastrophic failure of the female coupler 10. In this scenario, when the pressure level of the hydraulic fluid trapped in the trap chamber 30 becomes incrementally greater than the pressure level in the main cavity 26, the second relief valve 72 may be operable as a check valve to disengage from the piston sealing surface to allow flow from the trap chamber 30 across the piston internal flow passage 62 to the main cavity 26, thereby relieving the pressure in the trap chamber 30.

Figure 3:
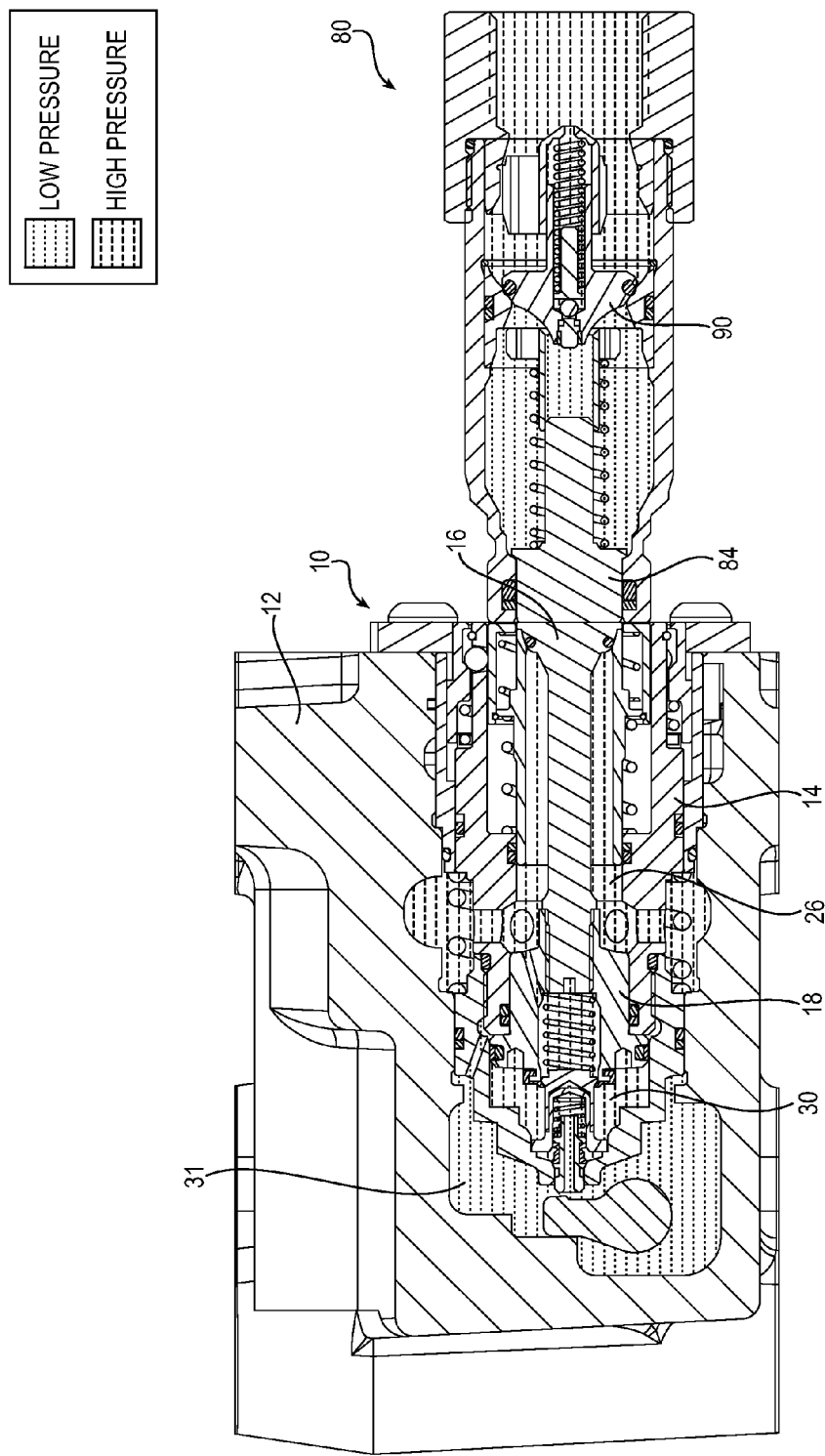

Referring to FIG. 3, the connect under pressure sequence begins with initial contact of the flat front face of the male coupler 80 to the flat front face of the female coupler 10. In the state shown, the respective components of both the female coupler 10 and the male coupler 80 have not yet moved.

Figure 4:
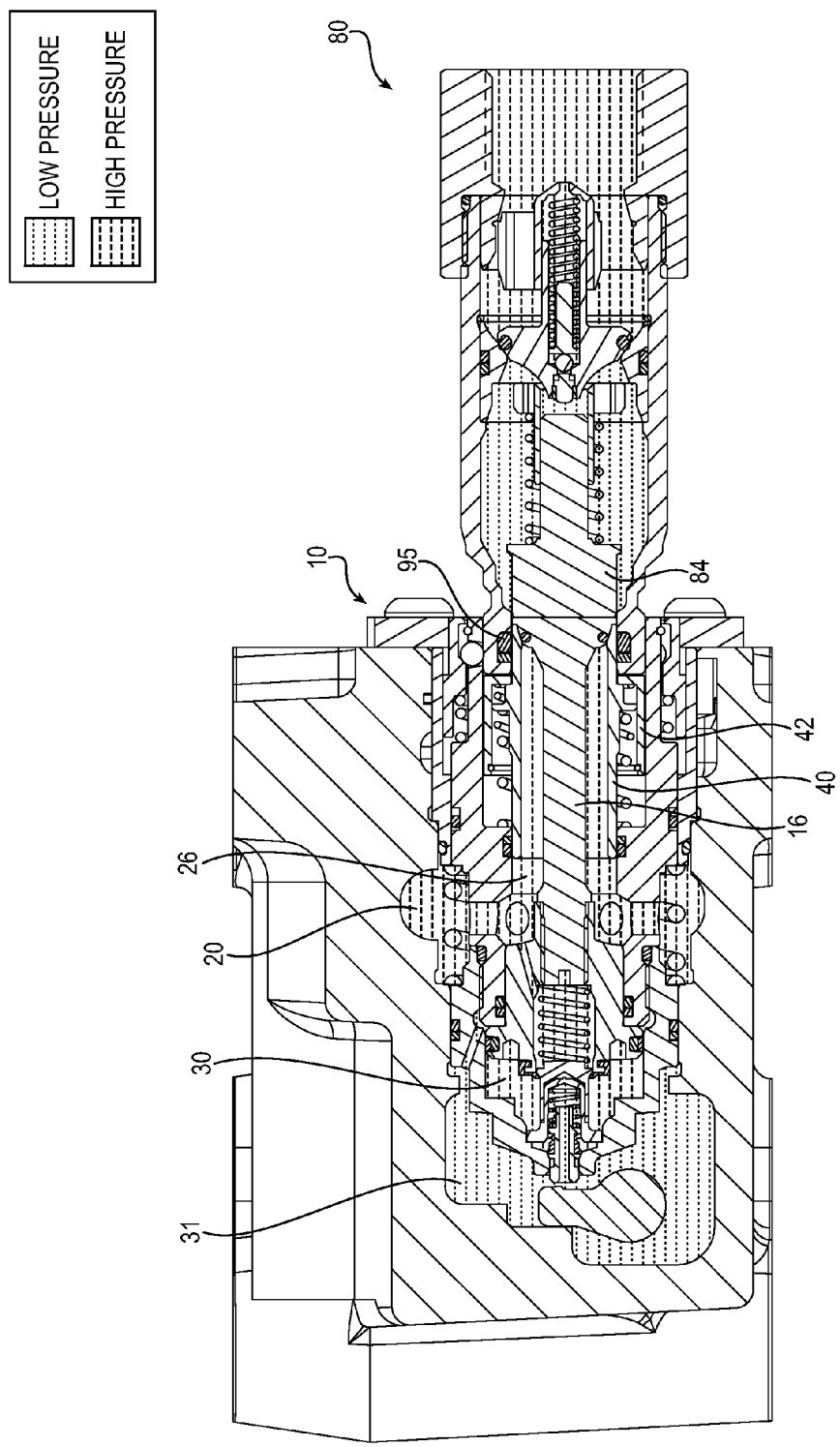

Referring to FIG. 4, the male coupler 80 is partially inserted into the female coupler 10. The male coupler 80 urges the face sleeve 42 rearward to expose a radially outer surface of the sealing sleeve 40. An interface seal 95 of the male coupler sealingly engages the radially outer surface of the sealing sleeve 40 to provide an initial seal between the couplers 10, 80. This initial sealing between the couplers 10, 80 may occur without opening any flow paths between the couplers so as to provide minimal spillage of hydraulic fluid. Also, when the face sleeve 42 is urged rearwardly, the face sleeve 42 no longer supports the locking element 52 in a radially outward unlocked position, but instead a radially outer forward portion of the male coupler 80 continues to support the locking element 52 in the unlocked position.

Figure 5:
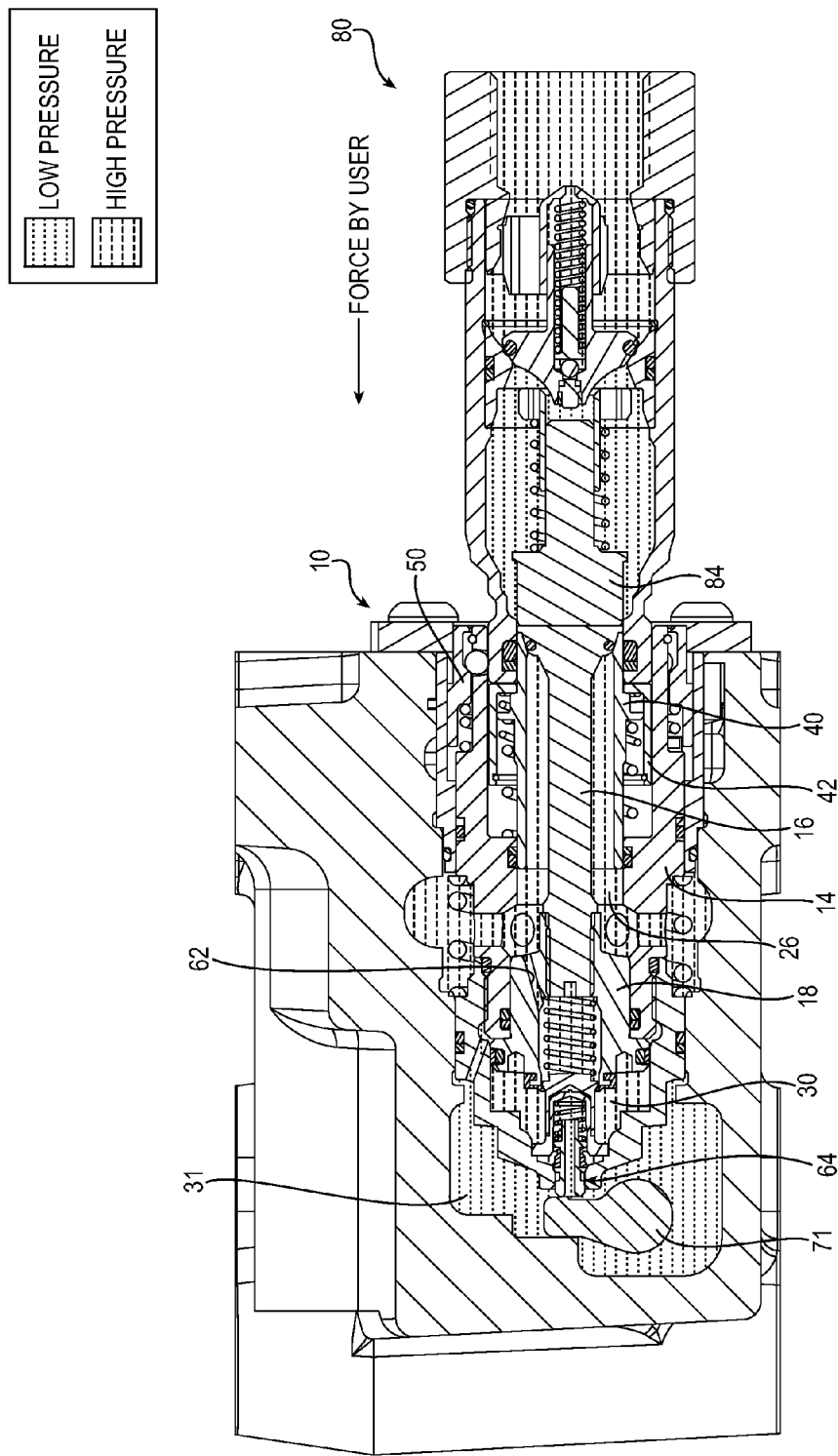

Referring to FIG. 5, the male coupler 80 continues to be inserted into the female coupler 10 with force from the user. In the illustrated state, there is still high pressure trapped in the main cavity 26, through-passage 62, spring chamber 33, and trap chamber 30. As the user continues to insert the male coupler 80 into the female coupler 10, the female valve body 14 may shift rearwardly toward the actuator 71. Other components within the valve body 14 (such as the valve member 16, piston 18, sealing sleeve 40, face sleeve 42, and locking collar 50) also may be translated rearward with the movement of the valve body 14. In the state shown, the relief valve 64 makes initial contact with the actuator 71 but has not yet activated the relief valve 64. As such, the pressure levels in the respective chambers and passages of the female coupler 10 and the male coupler 80 may remain about the same.

Figure 6:
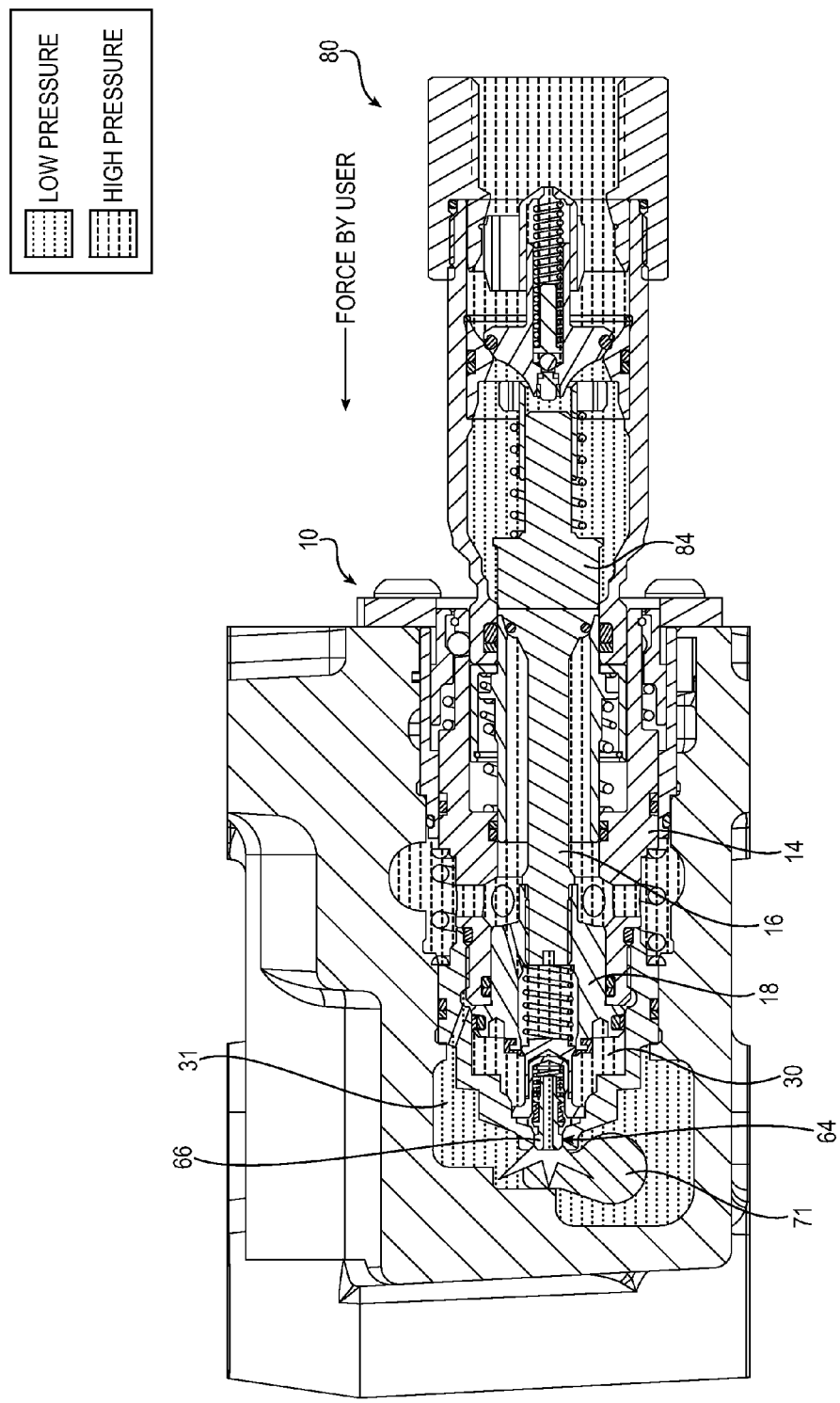

Referring to FIG. 6, the valve body 14 is shifted slightly rearward by the user such that the relief valve 64 is activated by the actuator 71. In the illustrated embodiment, the relief valve 64 is hydrostatically balanced and thus takes relatively little force to activate. When the relief valve 64 is activated, the valve spool 66 unseats from the valve body 14 to open the flow path from the trap chamber 30 to the low-pressure chamber 31, thereby initiating relief of the pressure in the trap chamber 30. The pressure levels in the male coupler 80 may remain about the same.

Figure 7:
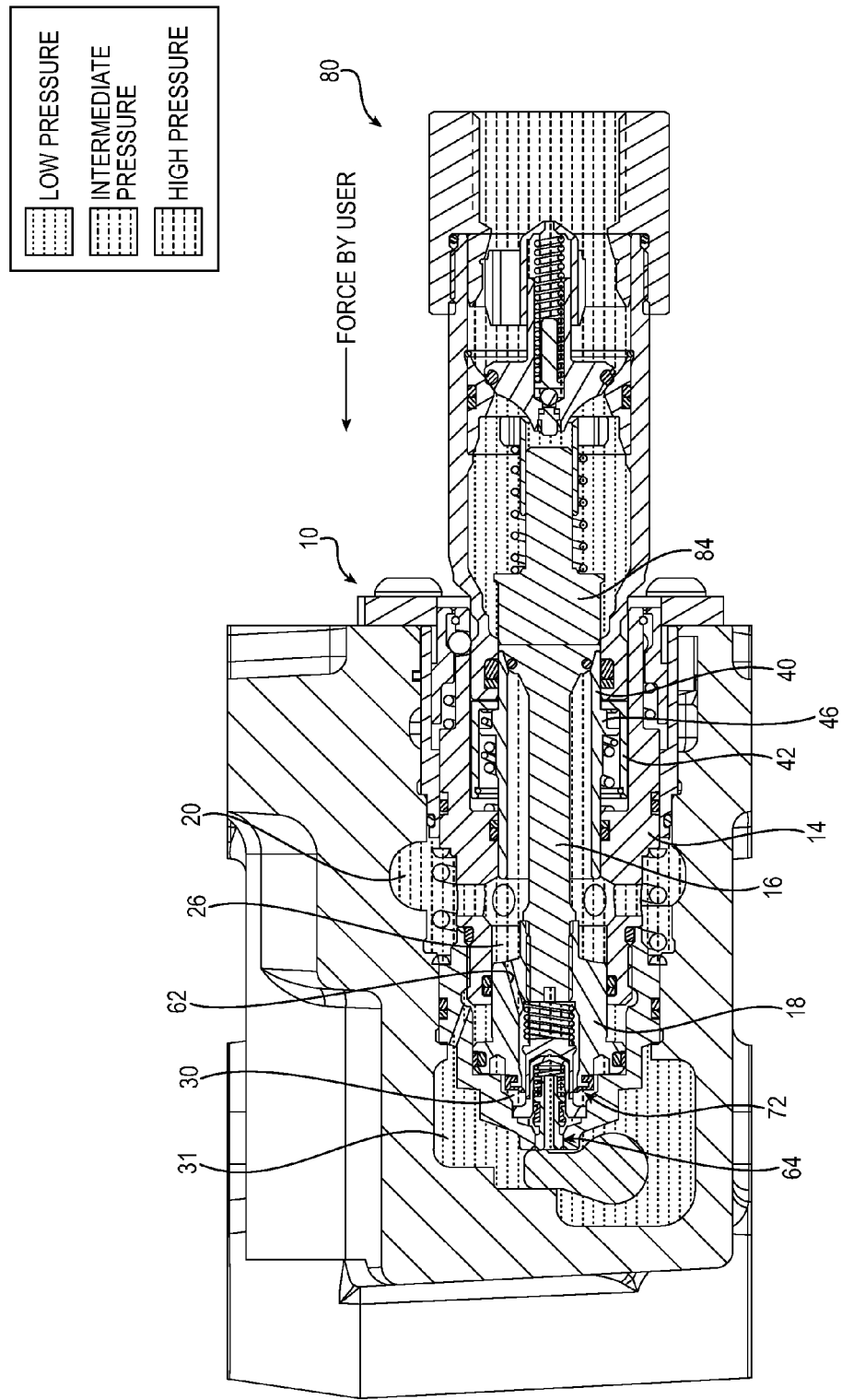

Referring to FIG. 7, the relief valve 64 remains activated and the pressure level in the trap chamber 30 is reduced to an intermediate pressure level between the previous high-pressure level and the low-pressure level of the chamber 31. The reduction of pressure in the trap chamber 30 allows the piston 18 and valve member 16 to shift rearwardly in response to the force exerted by the user inserting the male coupler 80. Also as shown, as the piston 18 shifts rearwardly, the second relief valve 72 is unseated from the piston sealing surface, or trap seal 74, thereby opening the fluid flow path from the main cavity 26 to the trap chamber 30, whereby the fluid can then flow across the first relief valve 64 to the low-pressure chamber 31, or outlet passage, and then to sump or tank. In addition, when the piston 18 and valve member 16 have shifted rearwardly, this allows the user to continue to advance the male coupler 80 into the female coupler 10, whereby the face sleeve 42 is urged rearwardly and abuts the sealing sleeve shoulder 46, and the sealing sleeve 40 is also shifted rearwardly.

Figure 8:
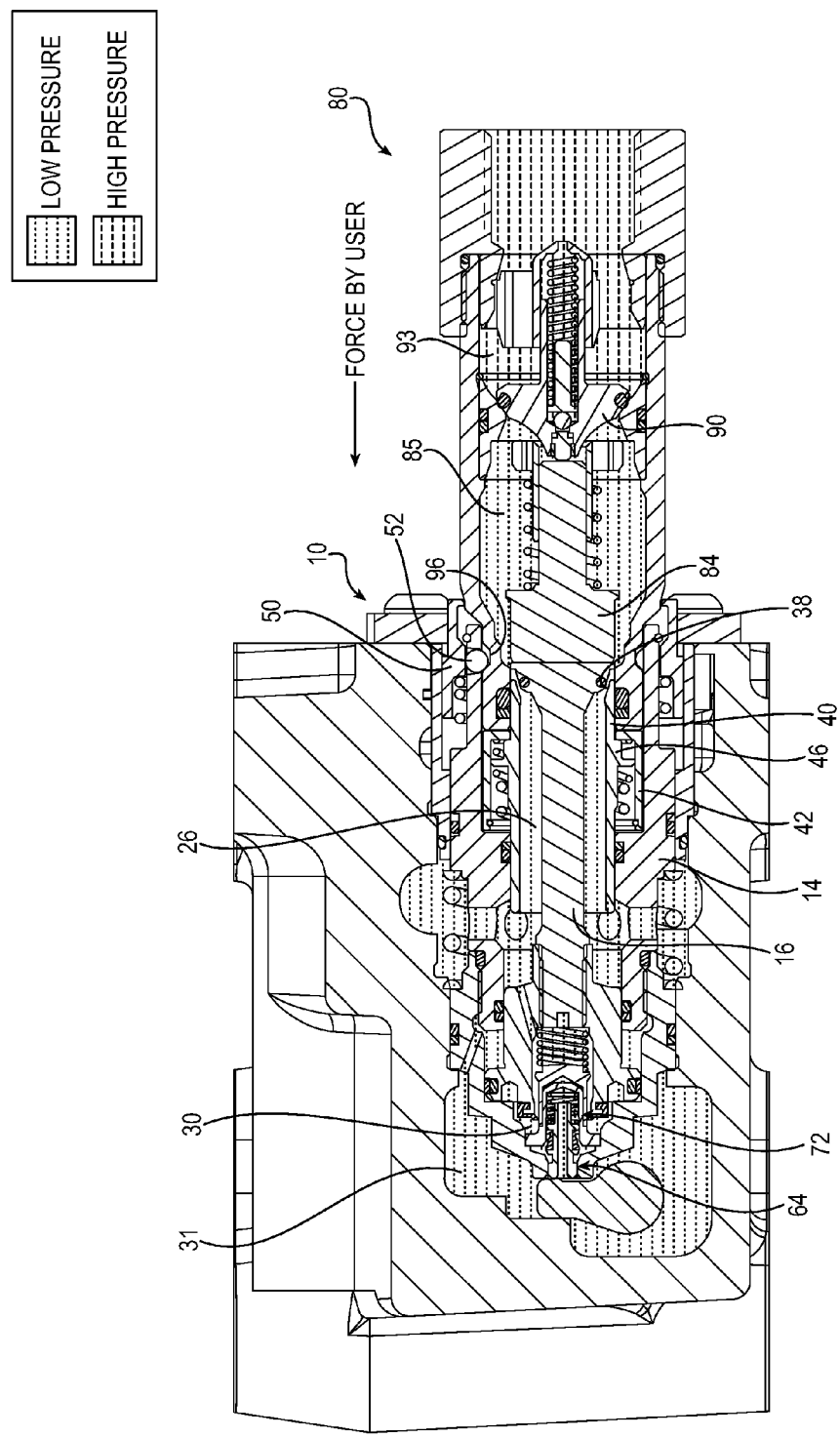

Referring to FIG. 8, the male coupler 80 continues to be inserted into the female coupler 10 by the user. In the illustrated state, the male coupler 80 has pushed the face sleeve 42 rearward to abut a portion of the valve member 14. The face sleeve 42 engaging the shoulder 46 of the sealing sleeve also urges the sealing sleeve 40 rearward such that the valve member 16 is unseated from the valve seat 38. At this point the main cavity 26 of the female coupler 10 is in fluid communication with the front chamber of the male coupler 80. The interface seal 95 of the male coupler continues to sealingly engage the radially outer surface of the sealing sleeve 40 such that the couplers 10, 80 may be in fluid communication with each other while providing sealing between the couplers during the connection sequence. In the illustrated state, the first relief valve 64 is still activated and the second relief valve 72 is disengaged from the piston sealing surface 74 to open the flow path such that the pressure level in the main cavity 26 through to the trap chamber 30 are at a low pressure level, such as at about the pressure level of the low pressure chamber 31, or outlet passage. The pressure level in the front chamber 85 of the male coupler 80 is still at a low pressure, and high pressure is still maintained in the rear chamber 93 behind the second valve 90 of the male coupler 80.

Also shown in FIG. 8, the male coupler 80 has been inserted far enough that the locking element 52 may move radially inwardly into a locking position within a locking groove 96 of the male coupler 80. The locking collar 50 is biased forwardly in the collar chamber which may help urge the locking element 52 into the locking position. Once the locking element 52 has cleared the locking collar 50, the locking collar 50 may snap forward to hold the locking element 52 within the locking groove 96 of the male coupler. An audible click may alert the user that the locking collar 50 is in the locked position. It is noted that the sequence of inserting the male coupler 80 into the female coupler 10 to lock the couplers together may occur without the need overcome the force of the centering spring 24, which may occur by virtue of the forwardly biased locking collar 50 being axially movable independent of the movement of the valve body 14. Such a configuration may enable easier connection for the user, since less force may be required to effect locking between the couplers 10, 80.

In exemplary embodiments, the at least one spring 32 that biases the piston 18 and valve member 16 toward a forward position in the female coupler 10 may have a spring force that is less than the spring force of the main spring 86 in the male coupler 80. This may allow the female valve body 14 to shift fully to the rear of the coupling so that the valve member 16 does not activate the male second valve 90 (e.g., decompression valve) that contains the high pressure in the rear chamber 93 of the male coupler. If the second valve 80 were activated to open, this may result in undesirable load movement of the implement during connection or disconnection. It is noted, however, that in other exemplary embodiments, the spring force of the spring 32 may be about the same as the main spring 86 in the male coupler, or the spring force of the spring 32 may be greater.

Figure 9:
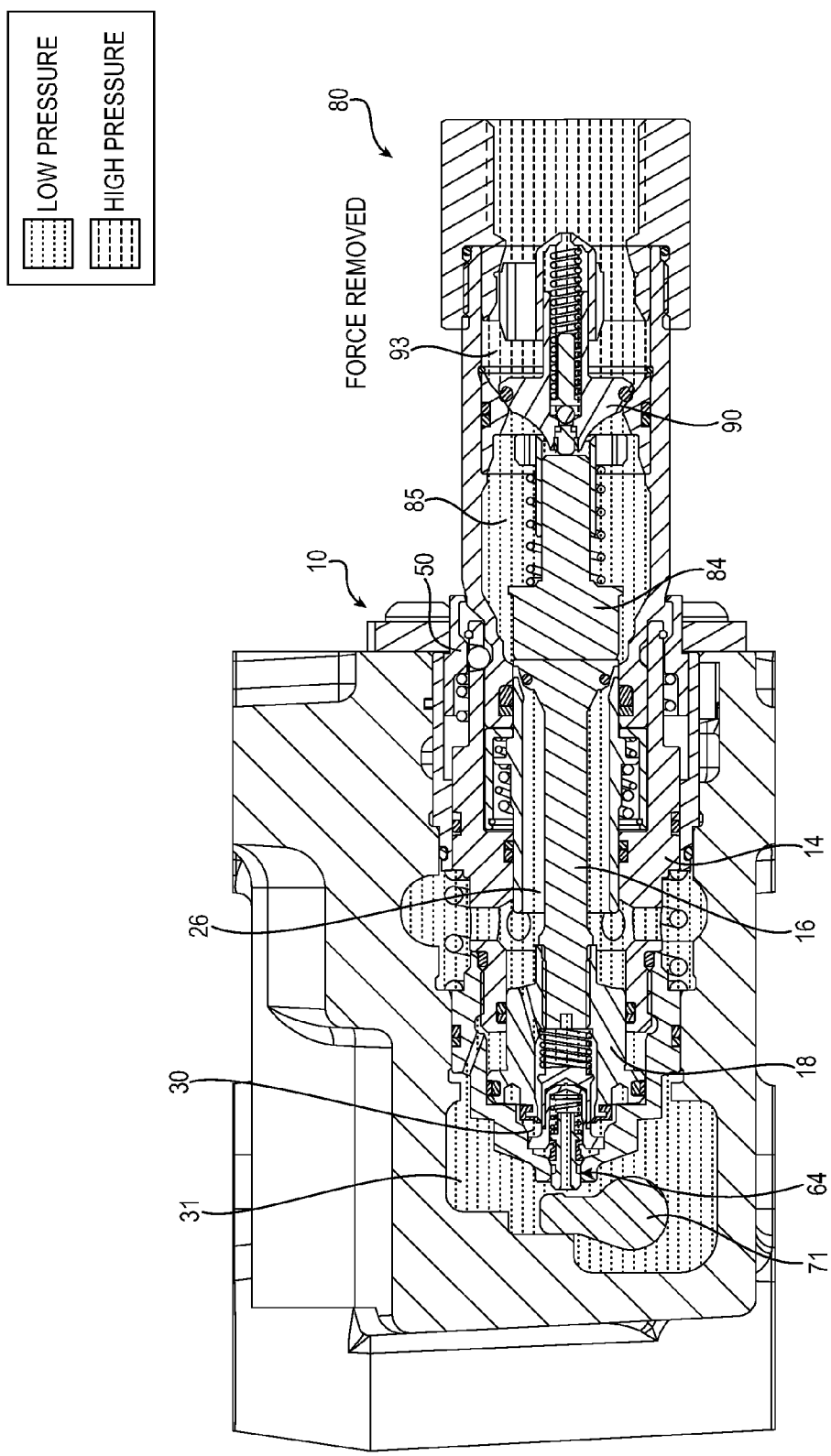

Referring to FIG. 9, the connection sequence is complete as the couplers 10, 80 are locked together and the force from the user is removed. In the illustrated state, the centering spring 24 shifts the valve member 14 and associated components slightly forward to a center position such that the relief valve 64 is no longer activated by engagement with the actuator 71. In the state shown, the pressure level in the female main cavity 26 through to the trap chamber 30 and low-pressure chamber 31 remains at low pressure. Also, the pressure level in the front chamber 85 of the male coupler 80 remains at a low pressure, and the second valve 90 still contains high-pressure in the rear chamber 93 of the male coupler.

Figure 10:
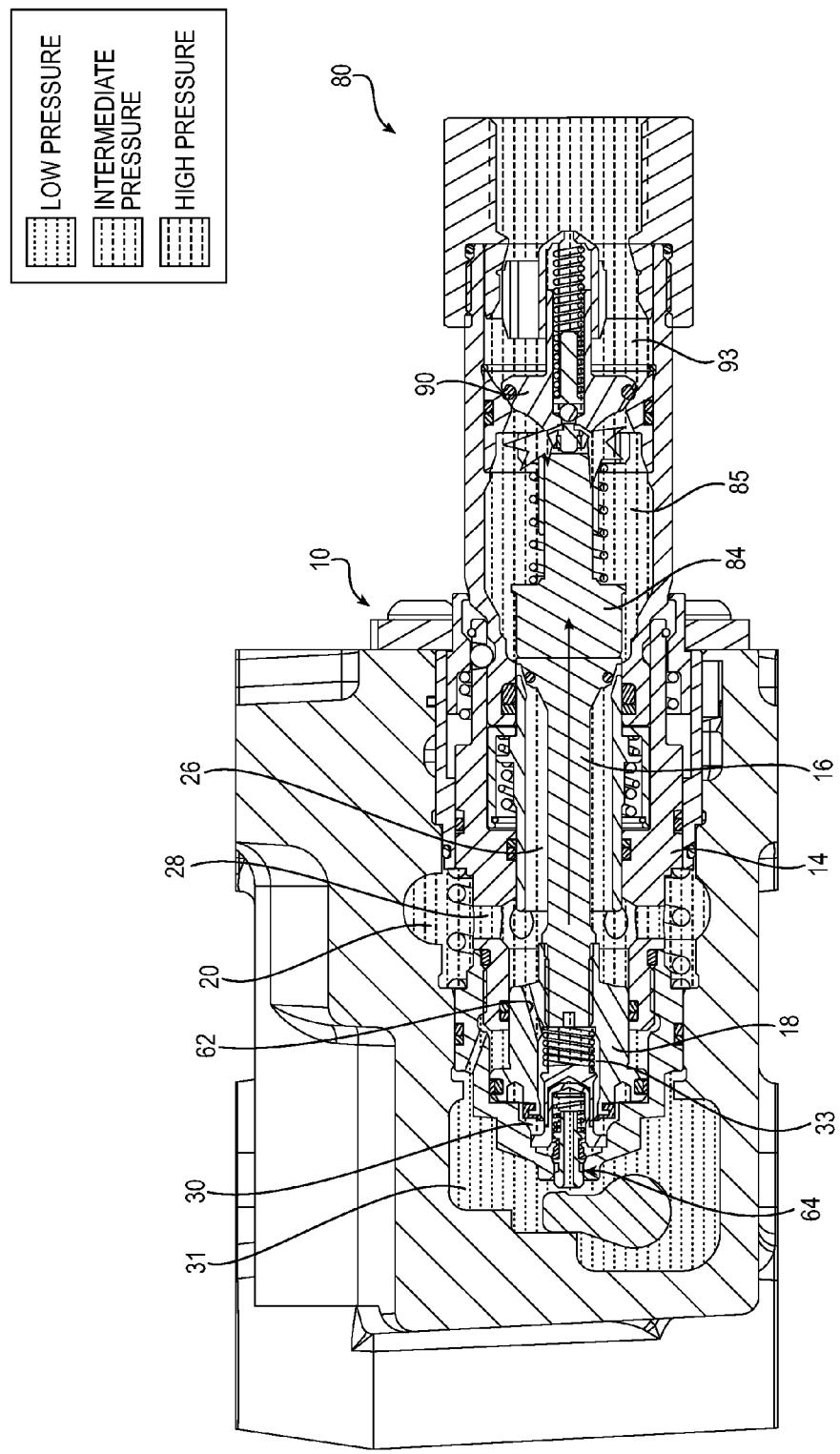
FIG. 10 is a cross-sectional side view of the female coupler in FIG. 9 coupled to the male coupler in FIG. 9 where hydraulic pressure is commanded to the coupling.
Figure 11:
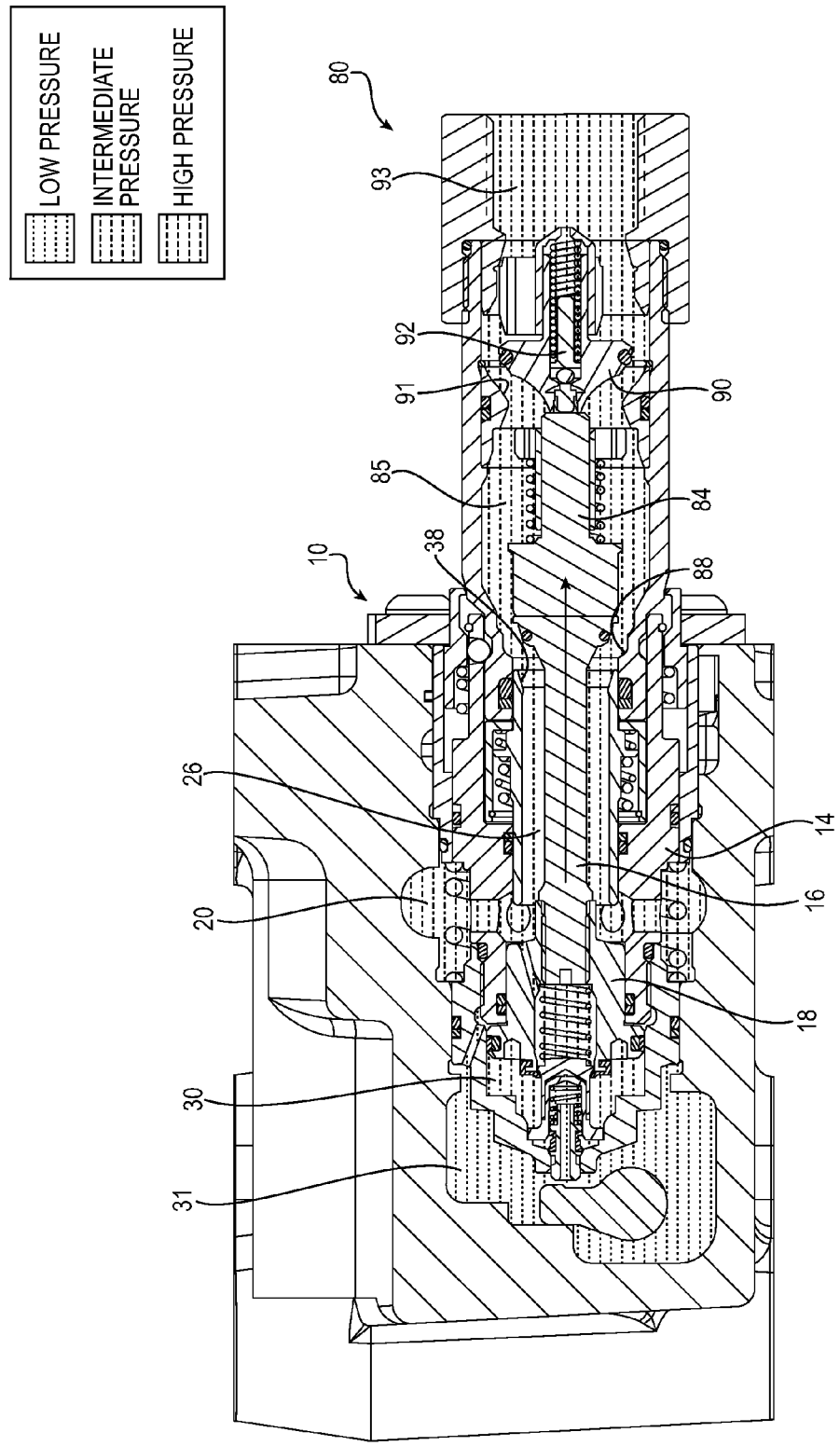
FIG. 11 is a cross-sectional side view of the female coupler in FIG. 10 coupled to the male coupler in FIG. 10 in a fully operational state.

Turning to FIGS. 10 and 11, operational states of the connected couplers 10, 80 are shown. Referring to FIG. 10, the user has commanded hydraulic pressure to the female coupler 10. This may occur by the user activating the tractor hydraulics to operate a fluid operated device, such as an actuator or cylinder, to raise or lower the implement connected to the male coupler 80, for example. The hydraulic fluid supplied to the female coupler 10 flows through the supply passage 20, across the centering spring 24 and to the main cavity 26 via the inlet passage 28. In addition, fluid flows from the main cavity 26 through the piston internal passage 62 to the trap chamber 30 via spring chamber 33. The flow path from the trap chamber 30 to the low-pressure chamber 31 is closed by the relief valve 64, and the pressure level from the supply passage 20 through the main cavity 26 to the trap chamber 30 increases to an intermediate level, such as an operational pressure level commanded by the hydraulics of the tractor, for example. Since the female coupler 10 is in fluid communication with the male coupler 80, the front chamber 85 of the male coupler has also increased to an intermediate level in the illustrated state, and the rear chamber 93 of the male coupler remains at high pressure.

As the fluid pressure in the trap chamber 30 begins to increase behind the piston 18, the piston 18 carrying the valve member 16 may begin to move forwardly to urge the male valve member 84 rearwardly in the male coupler 80. As discussed above, the piston 18 may be configured as an unbalanced piston in which the orifice 61 connects the low pressure from the chamber 31 between the forward seal(s) (e.g., seals 57 and 58) and the rearward seal(s) (e.g., seals 57 and 60), which seal at different diameters and thereby enable a hydraulic force differential between the fluid pressure acting on the respective forward and rearward seals. For example, in the illustrated embodiment, the rearward seals (57 and 60) that seal the piston 18 on the trap chamber side are at a larger diameter compared to the forward seals (57 and 58) that seal the piston 18 on the main cavity side. In this manner, the fluid pressure in the trap chamber 30 acting on the larger diameter rearward seals (57 and 60) is applied to a greater area, thereby intensifying the force applied to the rearward side of the piston 18 compared to the forward side of the piston. This force intensification on the rearward side of the unbalanced piston 18 pushes the valve member 16 against the male valve member 24, and may assist in opening the second valve 90 in the male coupler that resists being opened due to the relatively high pressure in the rear chamber 93. Once the male valve member 84 has been shifted rearward far enough, it may initiate activation of the second valve 90 (which may further be assisted through activation of the third valve 92 in some embodiments). In exemplary embodiments, the unbalanced ratio provided by the piston 18 may be 2:1, 3:1, 4:1 or more, including all ranges therebetween. As a non-limiting example, where an unbalanced ratio of 2:1 is provided, a hydraulic pressure of 1,500 psi in the female coupler is sufficient to open the flow path in the male coupler having a hydraulic pressure of 3,000 psi. However, it is understood that the ratio may be higher or lower as desired depending on the system requirements.

Referring to FIG. 11, a fully operational state of the connected couplers 10, 80 is shown. As shown, the piston 18 carrying the valve member 16 has shifted forward in response to the supply of fluid pressure to the main cavity 26 and the trap chamber 30 of the female coupler 10, as discussed above. In the illustrated state, the female valve member 16 has moved the male valve member 84 rearward to activate the second valve 90 in the male coupler with the assistance of the force intensification from the fluid pressure in the trap chamber 30 acting on the unbalanced piston 18. As shown, the female valve member 16 is unseated from valve seat 38, the male valve member 84 is unseated from valve seat 88, and the second valve member 90 is unseated from valve seat 91 to open the flow paths from the supply passage 20 in the female coupler 10 through to the rear chamber 93 in the male coupler 80. At this point, the pressure level in the female trap chamber 30, the female main cavity 26, the male front chamber 85, and the male rear chamber 93 are at about the same intermediate pressure level, such as an operational pressure level commanded by the hydraulics of the tractor to operate the implement, for example. In addition, in the fully operational state shown, the fluid in the trap chamber 30 remains trapped behind the piston 18 even when fluid is flowing from the male coupler 80 to the female coupler 10 during operation of the implement. In this manner, the trap chamber 30 is configured to retain fluid pressure therein, and due to the incompressible nature of the hydraulic fluid, enables a hydraulic lock function that restricts rearward movement of the piston and valve member to keep the flow paths between couplers 10, 80 open during such operation.

It is noted that if the fluid pressure in the trap chamber 30 were to increase due to thermal expansion of the hydraulic fluid, or other factors, then catastrophic failure of the female coupler 10 could occur. Thus, the ability of the second relief valve 72 to operate as a check valve to relieve trapped pressure in the trap chamber 30 across the piston internal flow passage 62 to the main cavity 26 may enable the fluid pressure in the trap chamber 30 to be reduced so as to prevent such catastrophic failure. In addition, the second relief valve 72 operable as a check valve through cooperation with the trap seal 74 may also prevent a vacuum created in the main cavity 26 from extracting the working fluid out of trap chamber 30. The vacuum resistance of the second relief valve 72 should be sufficiently higher than a pure vacuum so as to prevent working fluid from evacuating from the trap chamber 30.

Figure 12:
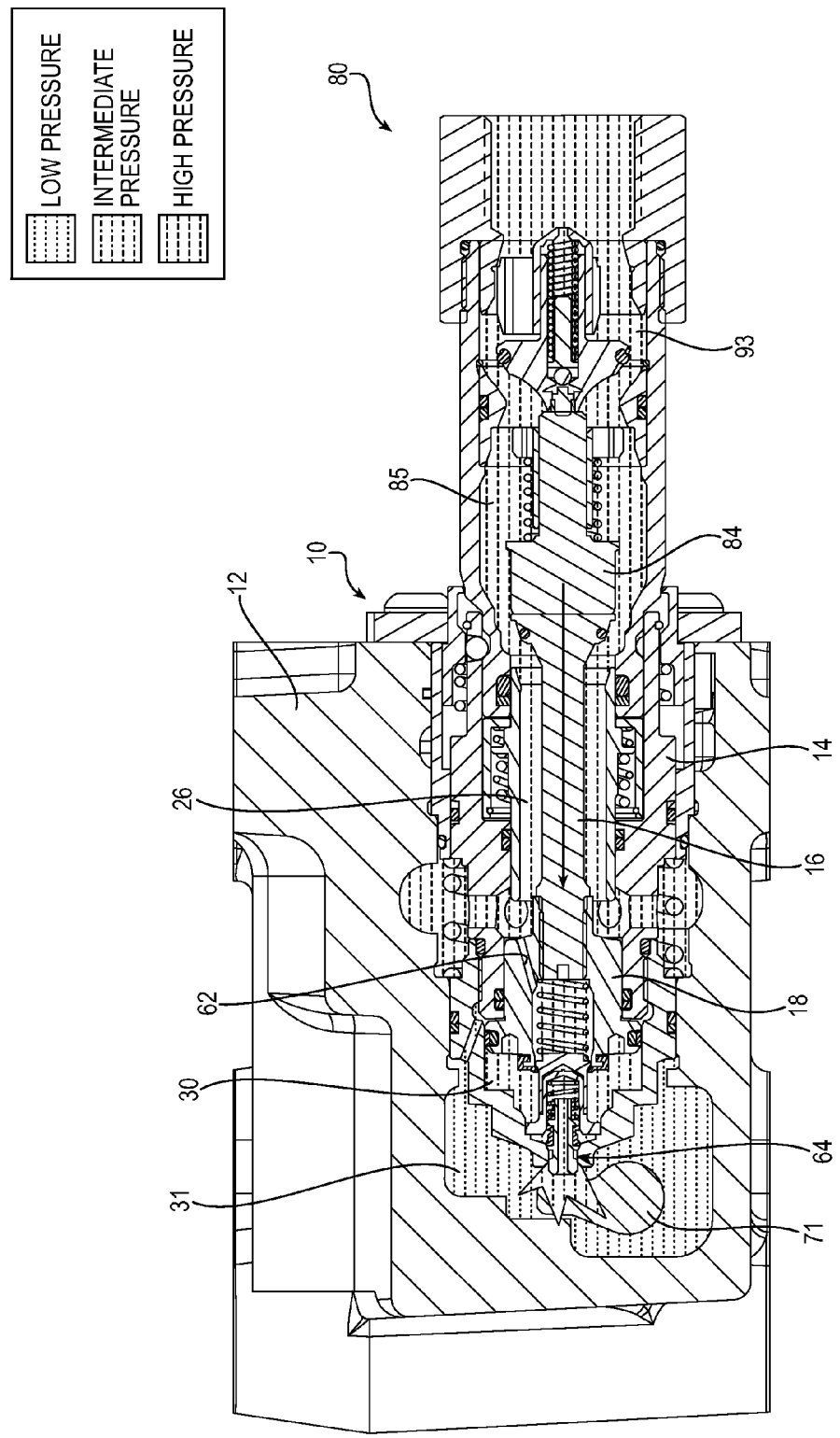
FIGS. 12-18 are a sequence of cross-sectional side views showing various states of the female coupler in FIG. 11 being disconnected from the male coupler in FIG. 11.

Turning to FIGS. 12-18, the disconnect operation of the male coupler 80 from the female coupler 10 will now be described in further detail. Referring to FIG. 12, the actuator 71 rotates to activate the relief valve 64, which opens the flow path from the trap chamber 30 to the low pressure chamber 31, thereby enabling a reduction in the trap chamber pressure. The actuator 71, such as a lever cam, may be operatively connect to a lever or other external device that enables the user to manually activate the relief valve 64 that is inside of the housing 12. In the illustrated state of disconnection, the male coupler 80 has high pressure in the rear chamber 93 and the front chamber 85, and the female coupler 10 has high pressure in the main cavity 26, all of which may have occurred during operation, such as while the implement is holding a load off of the ground for example, or after operation, such as due to increase in fluid temperature.

When the flow path from the trap chamber 30 to the low pressure chamber 31 is opened, fluid flows across the piston internal passage 62 and is able to flow between the flap, or lip, of the trap seal 74 and the relief poppet 73 into the trap chamber 30. In the illustrated embodiment, the piston internal passage 62 is sized as a fixed restriction orifice that causes a pressure drop across the piston 18 when fluid flows from the main cavity 26 to the trap chamber 30. This pressure drop caused by fluid flowing through the piston internal passage 62 effects a differential pressure on opposite sides of the piston 18, which enables the piston fixed to the valve member 16 to automatically shift rearwardly away from the male coupler 80.

Figure 13:
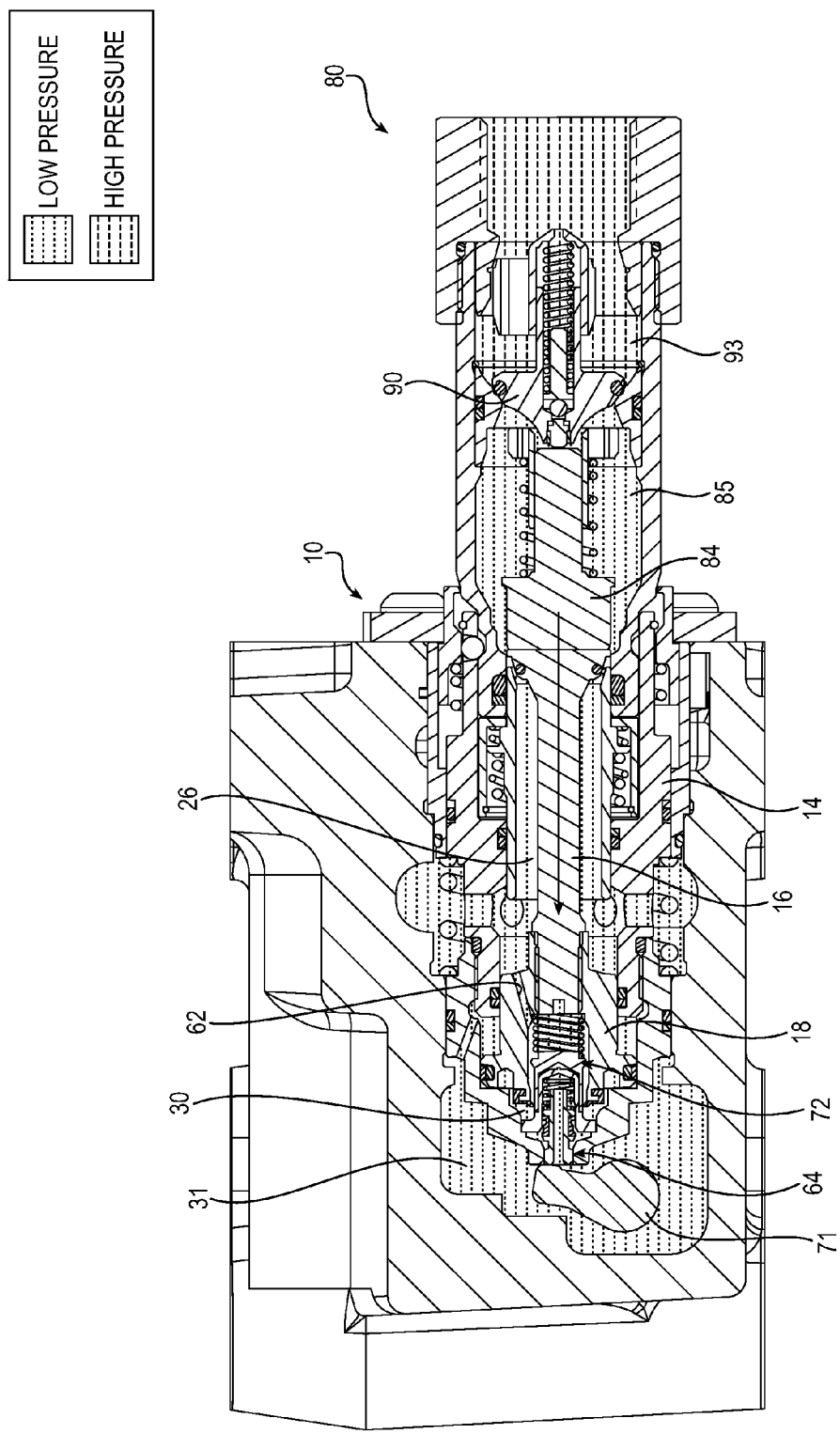

Referring to FIG. 13, the piston 18 and valve member 16 have shifted rearwardly after the relief valve 64 has been activated. The rearward movement of the piston 18 also unseats the second relief valve 72 from the trap seal 74, thus opening the flow path from the main cavity 26 to the low pressure chamber 31 via the piston internal passage 62, spring chamber 33, and trap chamber 30, all of which may be at about the pressure level of the low pressure chamber 31 which is fluidly connected to sump or tank. In addition, the rearward movement of the piston 18 and valve member 16 causes the male valve member 84 to move toward a closed position, which enables closure of the male second valve 90. In this state, the female main cavity 26 and the male front chamber 85 are still in fluid communication and may be at about the same pressure level, however the male rear chamber 93 is closed off from the front chamber 85 and may contain high pressure behind the second valve 90. The ability to maintain this high pressure in the male coupler 80 may allow disconnection between the couplers 10, 80 even while the implement is holding a load. The pressure levels in the respective chambers and passages may remain about the same for the remainder of the disconnect sequence.

Figure 14:
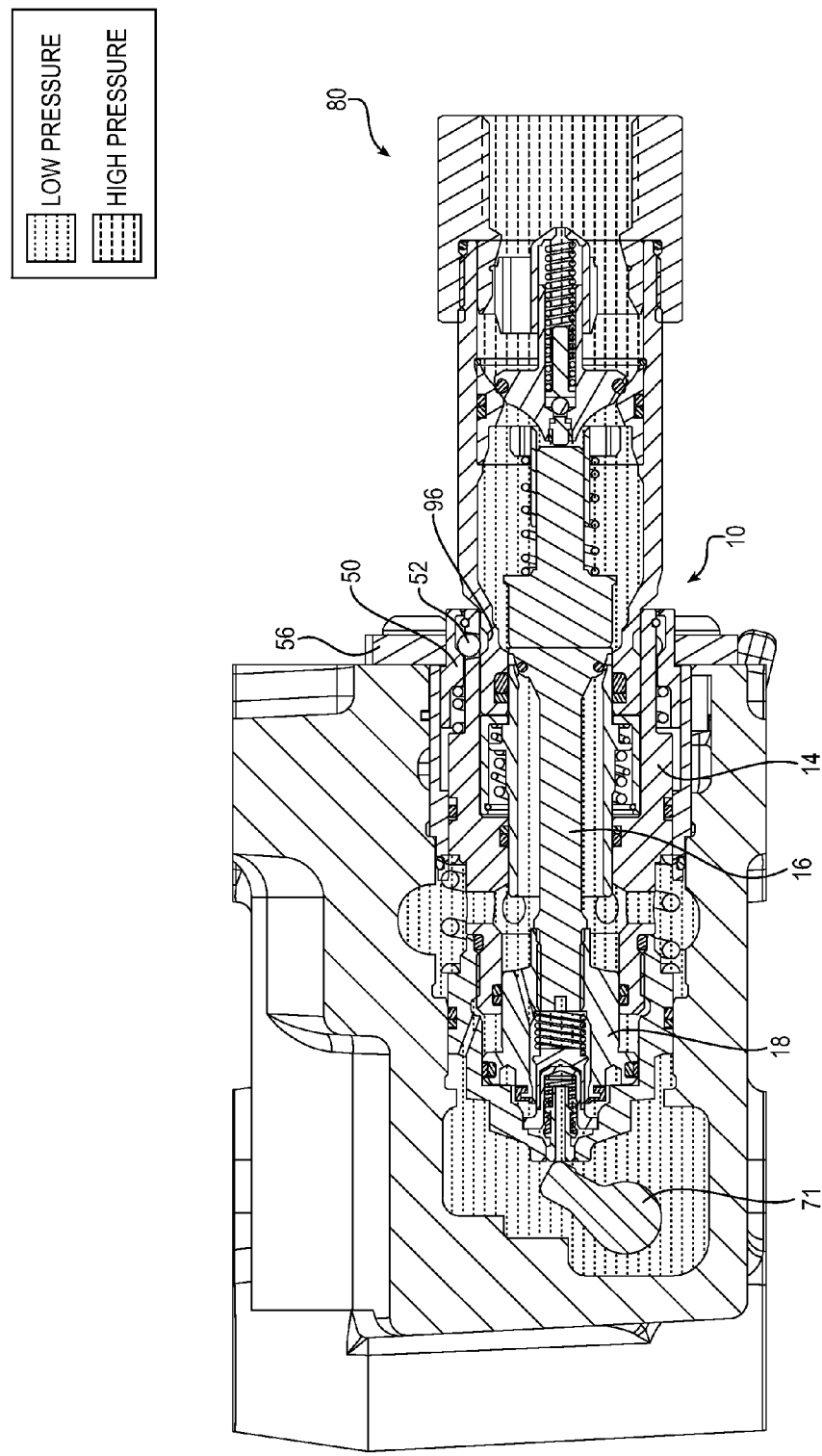

Referring to FIG. 14, the actuator 71 continues to rotate and force the female valve body 14 forward. The locking collar 50 being forwardly biased and independently movable relative to the valve body 14 abuts the retaining member 56, and the locking element 52 can move radially outwardly from the male locking groove 96 into a recess in the locking collar 50.

It is noted that the retaining member 56 may also be used as an emergency breakaway feature if the male coupler 80 were to be pulled away from the female coupler 10 without using the actuator 71. In this emergency breakaway scenario, the locking collar 50 is biased forwardly against the retaining member 56, and as the male coupler 80 is extracted, the locking element 52 is allowed to move into the recess of the locking collar 50 to clear the male coupler 80 being removed.

Figure 15:
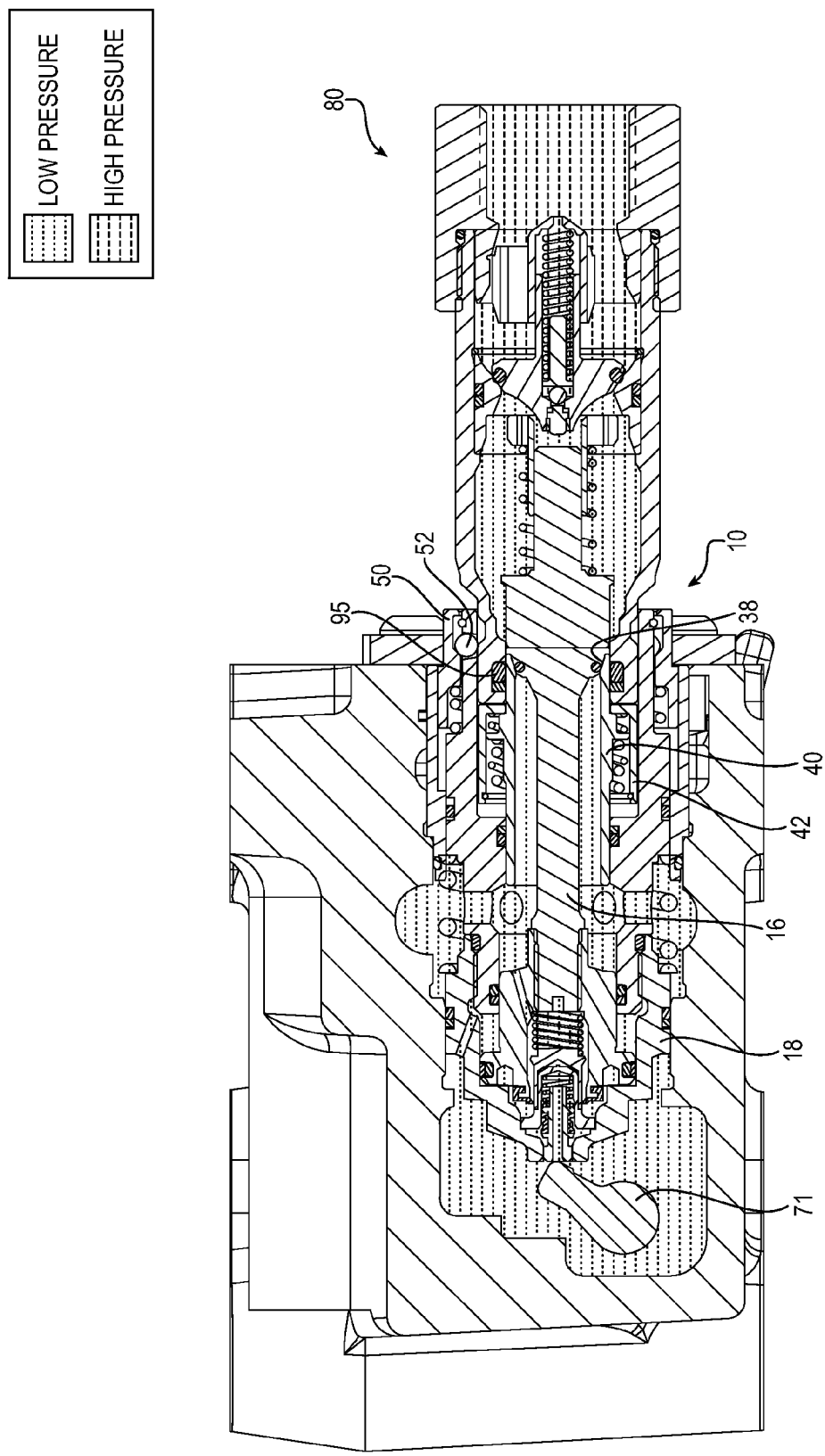

Referring to FIG. 15, the male coupler 80 continues to be extracted from the female coupler 10. In the state shown, the locking element 52 is supported by a forward portion of the male nipple in the unlocked position. In addition, the face sleeve 42 and sealing sleeve 40 have moved forward slightly, and the valve member 16 engages the valve seat 38 to close the flow path between the couplers 10, 80. The interface seal 95 of the male coupler 10 still engages the slidable sealing sleeve 40. In this manner, the female coupler 10 provides a non-spill interface that enables the couplers 10, 80 to be disconnected with minimal spillage of the hydraulic fluid.

Figure 16:
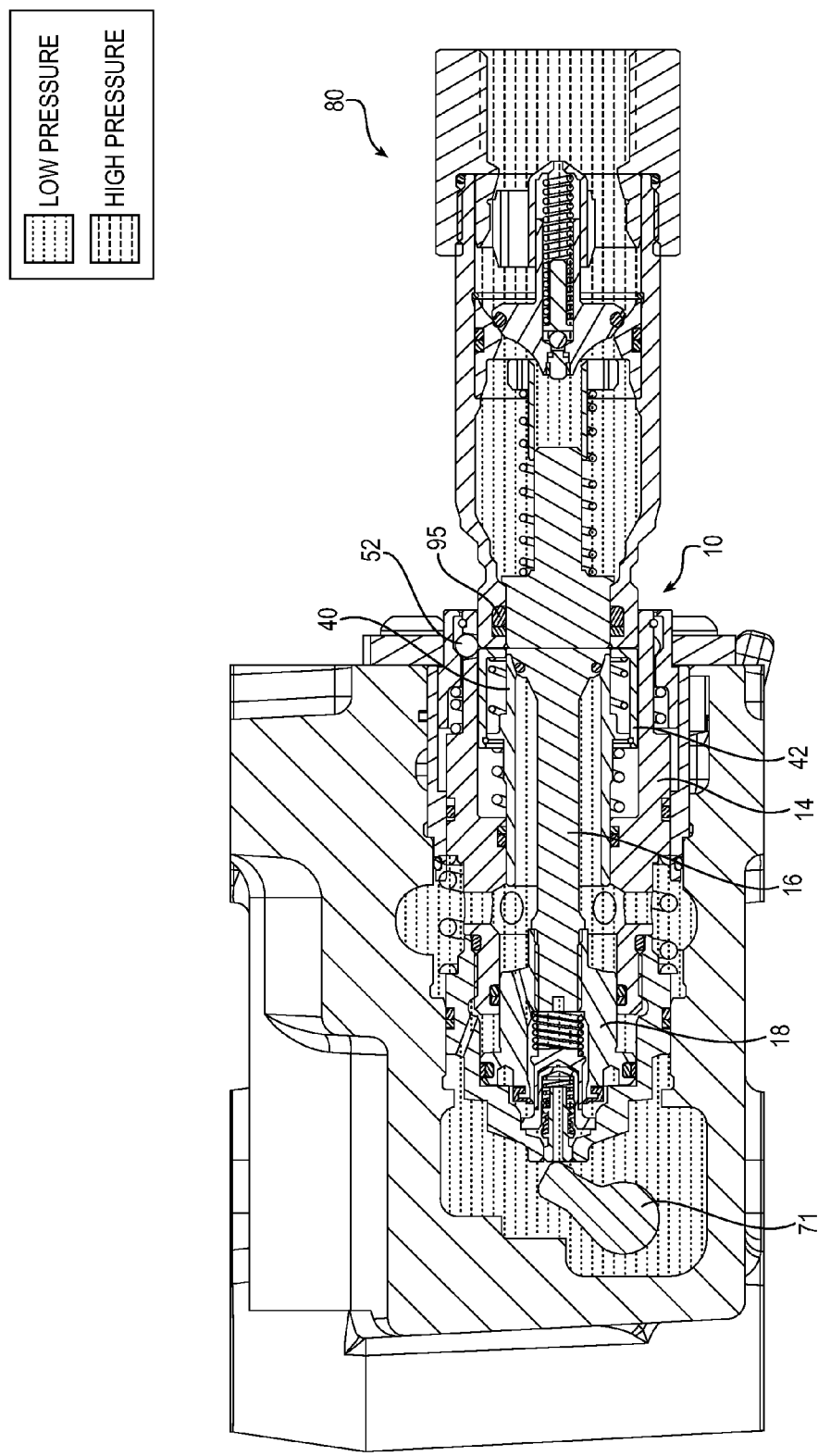

Referring to FIG. 16, the actuator 71 continues to rotate and the interface seal 95 is disengaged from the sealing sleeve 40. The face sleeve 42 may also continue to move forward along with the face of the male coupler 80 to support the locking element 52 in its unlock position.

Figure 17:
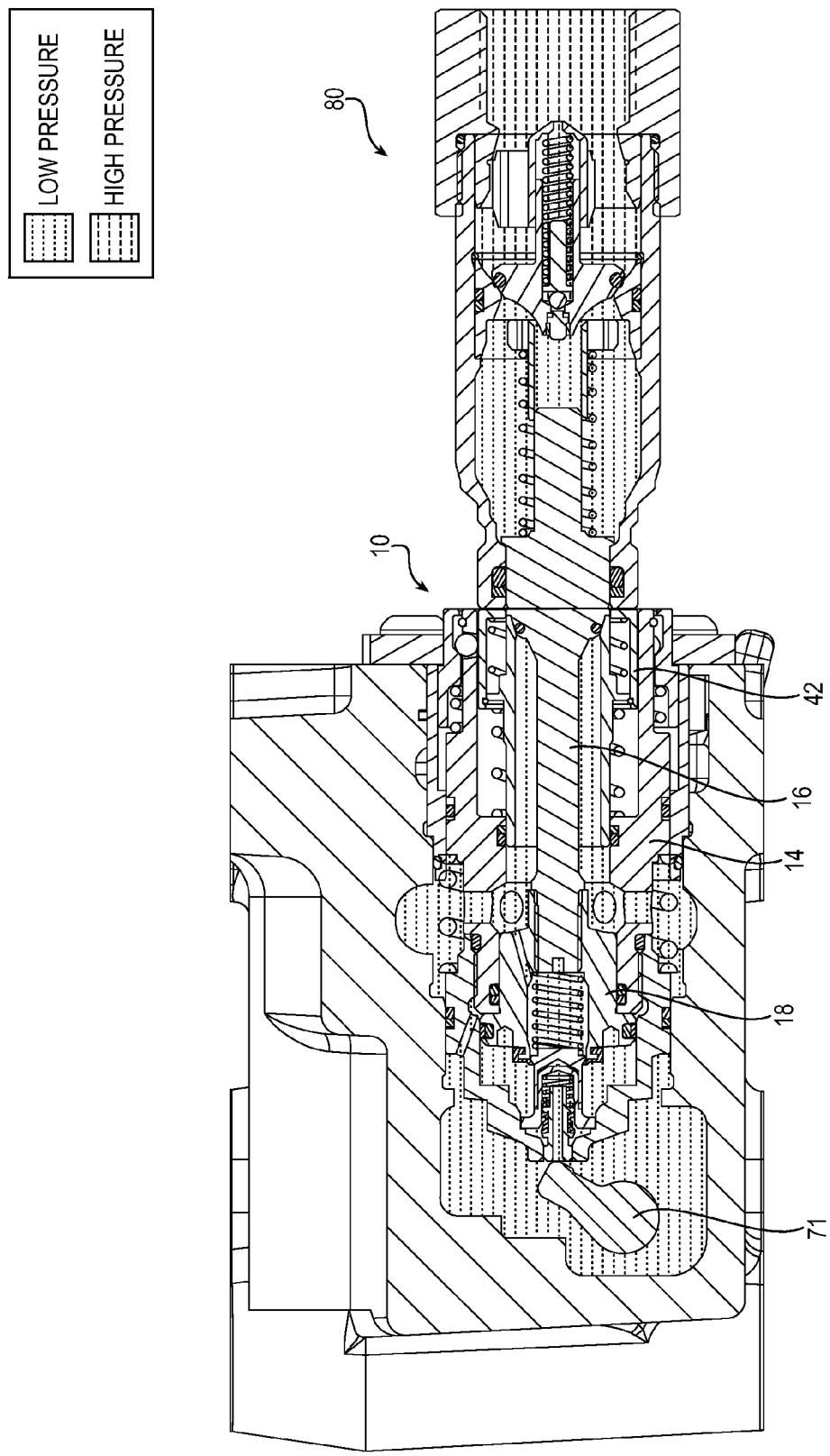

Referring to FIG. 17, the male coupler 80 is disconnected from the female coupler 10 with only the faces touching.

Figure 18:
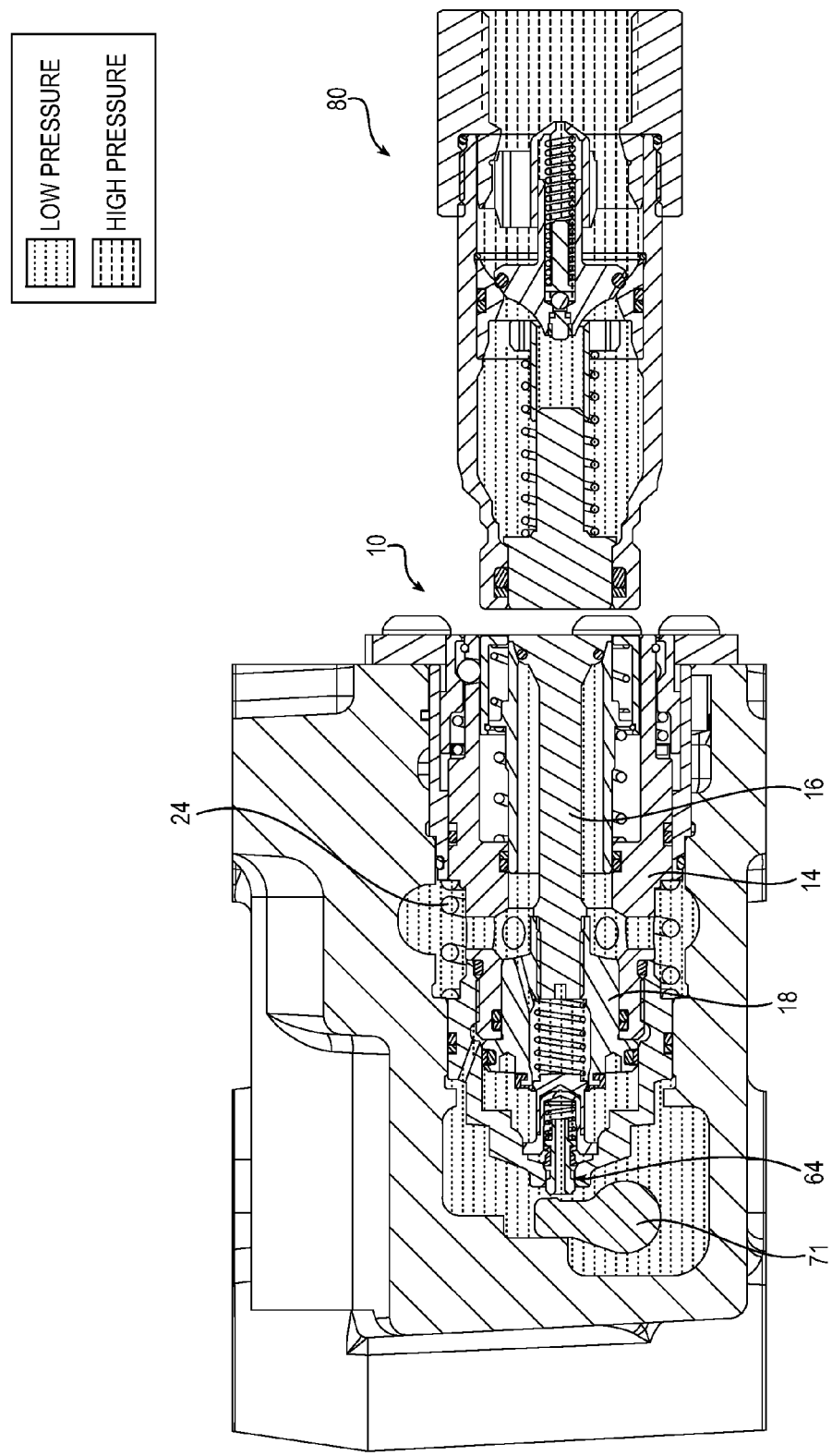

Referring to FIG. 18, the actuator 71 returns to its normal position disengaged from the relief valve 64 after the user has removed their hand from the lever. The centering spring 24 may return the valve body 14 to its center position.

Figure 19:
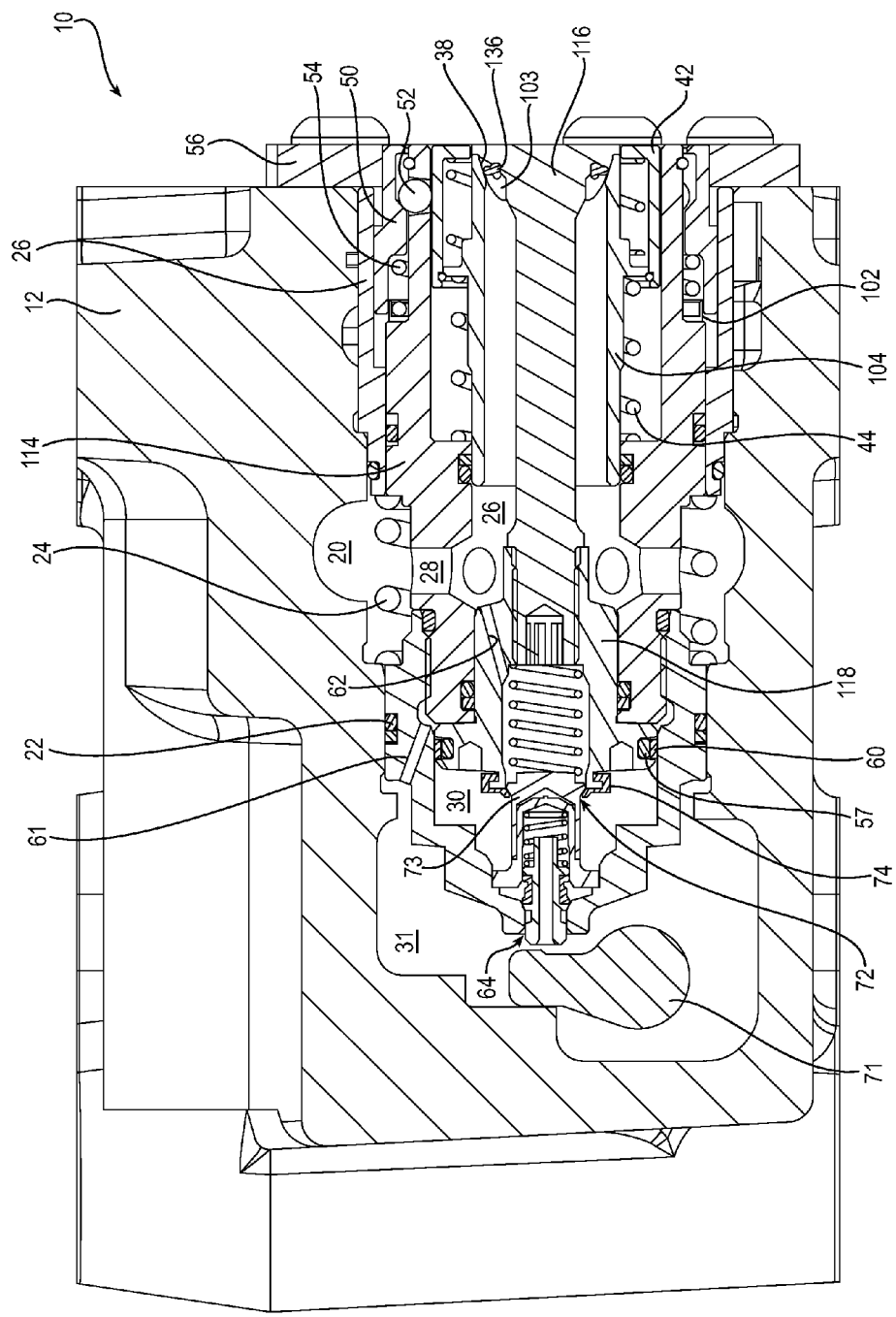
FIG. 19 is a cross-sectional side view of another exemplary female coupler according to an embodiment of the invention.

Turning to FIG. 19, another exemplary embodiment of a female coupler 110 is shown. The female coupler 110 is substantially the same as or similar to the above-referenced female coupler 10, and consequently the same reference numerals but indexed by 100 are used to denote structures corresponding to similar structures in the female coupler. In addition, the foregoing description of the female coupler 10 is equally applicable to the female coupler 110 except as noted below. Moreover, it understood that aspects of the female couplers 10, 110 may be substituted for one another or used in conjunction with one another where applicable.

In the illustrated embodiment, the female coupler 110 has a valve body 114 and a piston 118 in which the sealing diameter between the two is the same as the sealing diameter of the valve seat 38. Such a configuration may prevent unintended inner valve movement during the disconnect sequence due to the pressure imbalance between the two seals. In addition, the valve member 116 includes a t-shaped valve seal 136 that is retained by a press-fit valve retainer 103. Such a configuration may provide a valve member with improved strength. The female coupler 110 also includes a spring retainer 102 that is configured to prevent unintended spring movements. In addition, the sealing sleeve 144 has a shoulder that is disposed more rearwardly to change the stop position of the sealing sleeve 144 when open.

An exemplary quick coupling including exemplary female coupler(s) and male coupler has been described herein. The exemplary female coupler may enable safe connect or disconnect under pressure without movement of a load attachment connected to the coupling, and while providing minimal spillage of the operating fluid during the coupling or uncoupling.

Drawbacks of existing cartridge couplings include high connection forces, more than ideal oil spillage at disconnection, complicated use functions, undesirable load movements, internal coupling damage caused by thermal pressures, and/or seal damage caused by high attachment pressures.

The exemplary female coupler may provide advantages over such known couplers at all pressure levels with little spillage at disconnect, connection without load movement, disconnect without load movement, no hydraulic flow check, reduced connection forces, lower fuel consumption due to lower pressure loss, and/or emergency break-away integration.

In exemplary embodiments, the female coupler may be a cartridge-type coupling inserted into a cast iron housing, and which is adapted to connect hydraulic pressure lines between a mobile vehicle and an attachment, and more particularly to a hydraulic quick coupling of design for off highway, mobile equipment, such as a low speed agricultural tractor, for supply of hydraulic power to auxiliary equipment and attachments.

In exemplary embodiments, the female coupler may reduce coupling spillage by using non-spill interface, such as for agricultural tractor use.

In exemplary embodiments, the female coupler may provide a compact size that is interchangeable with existing cast iron housings being used on agricultural tractors, for example.

In exemplary embodiments, the female coupler may have a flat front face configured to work in conjunction with flat face style male couplings of a known type.

In exemplary embodiments, the female coupler may have a valve member rigidly attached to an axially movable piston. This may allow the female coupler to connect with a corresponding male coupler that has pressure trapped on the male side.

In exemplary embodiments, the female coupler may have a hydrostatically balanced relief valve positioned at the rear of the coupler that when activated during the connection relieves the hydraulic pressure of the coupling to a low pressure line and allows movement of a piston inside the coupling during the connect sequence.

In exemplary embodiments, the female coupler may be connected with the male coupler by hand with hydraulic system pressure on the female and/or male halves of the coupling, without opening the valve of the pressurized male half in the connection process. This may prevent an attachment load from moving on the male coupling side of the hydraulic circuit during connection, which enhances the safety of connecting under pressure.

In exemplary embodiments, the female coupler may have a piston interposed between a main cavity on one side of the piston and a trap chamber on an opposite side of the piston. The piston may include an internal flow passage extending through the piston to enable fluid flow to and from the main cavity and the trap chamber.

In exemplary embodiments, the piston may be an unbalanced piston, and once the female and male couplers are connected and hydraulic pressure is applied to the female half, the hydraulic pressure may be able to enter the area behind the piston, and due to a hydraulic imbalance the piston may be forced forward by hydraulic pressure to open the male half valves. In this manner, the male valve may be opened by the pressure from the female valve, and also by force created by the piston imbalance as a flow path is open between the male and female before the male valve is forced open. By allowing hydraulic pressure into the male half during this step, the male valve seals may be less likely to be damaged due to a reduction in the pressure differential.

In exemplary embodiments, the female coupler may provide a valve lock feature such that once the female valve member is in an operating position the flow path between male and female couplers may remain open even in very high reverse flows from male to female, which may prevent operation problems with tractor attachments. The valve lock may be a hydraulic valve lock in which hydraulic fluid enters behind the piston and remains trapped in the trap chamber.

If the valve lock is a hydraulic valve lock, the valve lock may also have a pressure relief feature to prevent thermal expansion inside the trap chamber. Hydraulic oil may have an expansion ratio of about 100 psi/° F. so changes in temperature of the surrounding coupling while in use can create a dramatic increase in pressure in the chamber that can cause internal failures of the coupling. For example, a tractor started at temperatures of 20° F. and then the couplings pressurized to 2900 psi will trap the 2900 psi oil in the chamber. If the temperature subsequently changes to 220° F. this may cause the pressure to go to 22,900 psi, which is likely to cause an internal failure.

In exemplary embodiments, the female coupler may include a check valve configured to allow fluid flow from a trap chamber on one side of a piston in the valve body to a main cavity on an opposite side of the piston in the valve body. The check valve may be configured to open the flow path from the trap chamber to the main cavity when the pressure in the trap chamber exceeds the pressure in the main cavity. Such a configuration may enable the fluid pressure in the trap chamber to be automatically relieved, which may reduce the pressure differential in the valve body, thereby reducing violent shifting of the valve body when fluid pressure in the trap chamber is manually relieved by a user. Also, by automatically relieving fluid pressure in the trap chamber in this way, catastrophic failure due to excessive pressures in the trap chamber may be prevented.

In exemplary embodiments, the design of the valve pressure lock relief may also be designed to resist vacuum loads caused by overrunning loads. Vacuum placed on the coupling has the ability to remove the hydraulic oil from the hydraulic pressure lock area. Once the oil is removed by the vacuum the valves are then able to shift as the hydraulic lock has been defeated. To prevent this, the vacuum resistance of the pressure lock relief should be sufficiently higher than a pure vacuum to prevent oil evacuation from the lock chamber.

In exemplary embodiments, the female coupler may include a locking collar that is axially movable and forwardly biased toward an opening of the female coupler such that the axial movement of the locking collar during the coupling of the male coupler is independent of the movement of valve body. Such a configuration may further improve the connect under pressure operation by reducing the force required by the user to lock the male coupler with the female coupler since the valve body does not need to be moved substantially for the locking to occur. Such a configuration may also prevent a non-connect range which is a problem of some known couplers as described above.

Because the locking sleeve in this design is independent of the body movement the coupling should latch at any pressure.

In exemplary embodiments, the female coupler may have a reduced female piston spring force where the spring force behind the piston is less than the spring force on the main valve of the connect under pressure male half. This may allow the female valve elements to shift fully to the rear of the coupler so that the valve member does not open the decompression valve inside the male half of the coupling. If the decompression valve were to open it may result in undesirable load movement and difficulty making a connection. Also, during disconnection, the load would continue to move during disconnection as the hydraulic oil would be allowed to flow to the low pressure line. Such a configuration may provide improvements due to high amounts of industry interchanges of the ISO 16028 male half.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A non-spill female coupler for quick connect/disconnect coupling with a corresponding male coupler, the non-spill female coupler comprising:
    a housing having an internal bore with an open forward end configured to receive the male coupler, and a supply passage for supplying pressurized fluid to the internal bore;
    a valve body slidably movable in the internal bore, the valve body defining an internal main cavity that opens to the forward end of the internal bore, and an inlet passage through the valve body for communicating the pressurized fluid from the supply passage to the main cavity;
    a valve member slidably movable in the valve body toward and away from a valve seat, the valve member having a front face, wherein the front face of the valve member is configured to engage a corresponding front face of the male coupler;
    a face sleeve disposed radially outwardly of the valve member and radially inwardly of the valve body, the face sleeve being axially moveable relative to the valve member and the valve body between a forward and a rearward position, wherein the face sleeve has a front face that is configured to be flush with the front face of the valve member and is configured to be flush with a front face of the valve body when the face sleeve is in the forward position; and
    a piston fixed to the valve member for common movement, the piston being interposed between the main cavity on one side of the piston and a trap chamber on an opposite side of the piston;
    wherein the piston includes an internal flow passage extending through the piston to enable fluid connection of the main cavity with the trap chamber.

2. The non-spill female coupler according to claim 1, wherein the piston carries the valve member in response to a hydraulic force differential created between the pressure in the trap chamber on the one side of the piston and the pressure in the main cavity on the opposite side of the piston.

3. The non-spill female coupler according to claim 1, wherein the piston is an unbalanced piston that defines at least a portion of the trap chamber, and is configured to intensify force applied to the valve member for enabling opening of a corresponding valve member in the male coupling.

4. The non-spill female coupler according to claim 1, wherein the trap chamber is configured to retain a pressure that restricts rearward movement of the piston and valve member when fluid is flowing into the female coupler.

5. The non-spill female coupler according to claim 1,
    wherein the housing includes an outlet passage in fluid communication with a low pressure line;
    wherein the female coupler further comprises a relief valve configured to open and close a flow path between the trap chamber and the outlet passage; and
    wherein, when the relief valve is activated, the flow path is opened to allow flow from the trap chamber to the outlet passage, thereby reducing pressure in the trap chamber and allowing the piston to shift rearwardly.

6. The non-spill female coupler according to claim 5, wherein a rearward portion of the valve body defines at least a portion of the trap chamber internal to the valve body; and
    wherein the relief valve is a hydrostatically balanced relief valve having a spool sealingly engageable with a sealing surface of the valve body, the spool being activatable by an actuator to open the flow path between the trap chamber and the outlet passage.

7. A quick connect/disconnect coupling comprising the non-spill female coupler according to claim 1 in combination with the male coupler,
    wherein the piston fixed to the valve member of the female coupler is biased forwardly by a spring; and
    wherein the spring has a spring force that is less than a spring force of a main biasing spring in the male coupler.

8. The non-spill female coupler according to claim 1, wherein the valve body is hydrostatically balanced in the internal bore.

9. The non-spill female coupler according to claim 1, wherein the female coupler is configured to have a non-spill interface with the corresponding male coupler.

10. The non-spill female coupler according to claim 1, wherein the valve member has a flat front face, wherein the flat front face of the valve member is configured to engage a corresponding flat front face of the male coupler.

11. A quick connect/disconnect coupling comprising the non-spill female coupler according to claim 1 in combination with the male coupler.

12. A non-spill female coupler for quick connect/disconnect coupling with a corresponding male coupler, the non-spill female coupler comprising:

a housing having an internal bore with an open forward end configured to receive the male coupler, and a supply passage for supplying pressurized fluid to the internal bore;

a valve body slidably movable in the internal bore, the valve body defining an internal main cavity that opens to the forward end of the internal bore, and an inlet passage through the valve body for communicating the pressurized fluid from the supply passage to the main cavity;

a valve member slidably movable in the valve body toward and away from a valve seat, the valve member having a front face, wherein the front face of the valve member is configured to engage a corresponding front face of the male coupler; and a piston fixed to the valve member for common movement, the piston being interposed between the main cavity on one side of the piston and a trap chamber on an opposite side of the piston;

wherein the piston includes an internal flow passage extending through the piston to enable fluid connection of the main cavity with the trap chamber;

wherein the housing includes an outlet passage in fluid communication with a low pressure line;

wherein the female coupler further comprises a relief valve configured to open and close a flow path between the trap chamber and the outlet passage;

wherein, when the relief valve is activated, the flow path is opened to allow flow from the trap chamber to the outlet passage, thereby reducing pressure in the trap chamber and allowing the piston to shift rearwardly;

wherein the relief valve is a first relief valve, and the female coupler further comprising a second relief valve configured to cooperate with the piston, the piston carrying a sealing surface for sealingly engaging the second relief valve;

wherein, when the first relief valve is activated and the flow path is opened to allow flow from the trap chamber to the outlet passage, the pressure in the trap chamber is reduced such that the piston moves to disengage the piston sealing surface from the second relief valve, thereby enabling a flow path to open from the main cavity to the outlet passage across the piston internal flow passage and the trap chamber.

13. The non-spill female coupler according to claim 12, wherein the piston internal flow passage is sized such that, when the flow path is opened from the main cavity to the outlet passage across the piston internal passage, a pressure drop occurs causing the pressure on the rearward side of the piston to be reduced relative to the pressure on the forward end of the piston, thereby allowing the piston carrying the valve member to shift rearwardly in response to the pressure differential between the opposite sides of the piston.

14. A non-spill female coupler for quick connect/disconnect coupling with a corresponding male coupler, the non-spill female coupler comprising:

a housing having an internal bore with an open forward end configured to receive the male coupler, and a supply passage for supplying pressurized fluid to the internal bore;

a valve body slidably movable in the internal bore, the valve body defining an internal main cavity that opens to the forward end of the internal bore, and an inlet passage through the valve body for communicating the pressurized fluid from the supply passage to the main cavity;

a valve member slidably movable in the valve body toward and away from a valve seat, the valve member having a front face, wherein the front face of the valve member is configured to engage a corresponding front face of the male coupler; and a piston fixed to the valve member for common movement, the piston being interposed between the main cavity on one side of the piston and a trap chamber on an opposite side of the piston;

wherein the piston includes an internal flow passage extending through the piston to enable fluid connection of the main cavity with the trap chamber;

wherein the non-spill female coupler further comprises:

a cylindrical face sleeve axially moveable relative to the valve body, the face sleeve having a front face, wherein the front face of the face sleeve is configured to be engageable with the front face of the male coupler when the male coupler is inserted into the female coupler;

a sleeve spring urging the face sleeve forwardly; and a sealing sleeve disposed radially inwardly of the valve body and slidably movable in the main cavity, the sealing sleeve defining the valve seat toward the forward end of the main cavity;

wherein the sealing sleeve is disposed radially inwardly of the face sleeve and axially moveable relative to the face sleeve, the sealing sleeve having a radially outward shoulder that is engageable with the face sleeve to move the sealing sleeve forward or rearward in response to axial movement of the face sleeve.

15. A non-spill female coupler for quick connect/disconnect coupling with a corresponding male coupler, the non-spill female coupler comprising:

a housing having an internal bore with an open forward end configured to receive the male coupler, and a supply passage for supplying pressurized fluid to the internal bore;

a hydrostatically balanced valve body slidably movable in the internal bore, the valve body defining a main cavity that opens to the forward end of the housing internal bore, and an inlet passage through the valve body for communicating the pressurized fluid from the supply passage to the main cavity;

a valve member slidably movable in the valve body toward and away from a valve seat, the valve member having a front face, wherein the front face of the valve member is configured to engage a corresponding front face of the male coupler;

an unbalanced piston interposed between the main cavity and a trap chamber rearward of the piston, the unbalanced piston configured to move the valve member within the valve body; and a locking collar toward the open forward end of the internal bore, the locking collar being axially movable in a collar chamber between forward and rearward positions;

wherein a spring is configured to bias the locking collar forwardly such that the axial movement of the locking collar during the coupling of the male coupler is independent of the movement of valve body;

wherein the non-spill female coupler further comprises:

a cylindrical face sleeve axially moveable relative to the valve body, the face sleeve having a front face, wherein the front face of the face sleeve is configured to be engageable with the front face of the male coupler when the male coupler is inserted into the female coupler; and a sleeve spring configured to urge the face sleeve forwardly;

wherein the locking collar cooperates with the face sleeve, such that the face sleeve is operative to support at least one locking element radially outwardly at an unlock position when the face sleeve is in a forward position, and when the face sleeve is moved rearwardly to unsupport the locking element, the locking collar is operative to urge the locking element radially inwardly into a locking groove of the male coupler and hold the locking element in a locking position.

16. The non-spill female coupler according to claim 15, wherein the locking collar in its forward position being operative to hold the at least one locking element at the locking position such that the locking element protrudes radially inwardly for engaging the locking groove in the male coupler, and the locking collar in its rearward position enabling radial outward movement of the locking element for disengagement from the locking groove in the male coupler.

17. The non-spill female coupler according to claim 16, further comprising a retaining member configured to prevent the locking collar from forward movement beyond a specified position;

wherein, when the male coupler is decoupled from the female coupler in an emergency breakaway situation, the retaining member is configured to hold the locking collar in the specified position, thereby enabling the at least one locking member to be urged radially outwardly into its release position to enable the male coupler to be removed from the female coupler.

18. A quick connect/disconnect coupling comprising the non-spill female coupler according to claim 15 in combination with the male coupler, wherein, when the locking collar of the female coupler urges the locking element radially inwardly into the locking groove of the male coupler to hold the locking element in the locking position, the locking collar protrudes forwardly of the valve body to engage a portion of the male coupler, which acts as a stop to the forward movement of the locking collar.

19. A non-spill female coupler for quick connect/disconnect coupling with a corresponding male coupler, the non-spill female coupler comprising:

a housing having an internal bore with an open forward end configured to receive the male coupler, and a supply passage for supplying pressurized fluid to the internal bore;

a valve body slidably movable in the internal bore, the valve body defining an internal main cavity that opens to the forward end of the internal bore, and an inlet passage through the valve body for communicating the pressurized fluid from the supply passage to the main cavity;

a valve member slidably movable in the valve body toward and away from a valve seat, the valve member having a front face, wherein the front face of the valve member is configured to engage a corresponding front face of the male coupler;

a piston fixed to the valve member for common movement, the piston being interposed between the main cavity on one side of the piston and a trap chamber on an opposite side of the piston; and a check valve configured to allow fluid flow from the trap chamber to the main cavity when the pressure in the trap chamber is greater than the pressure in the main cavity;

wherein the piston carries a sealing surface configured to cooperate with the piston to open and close a flow path between the trap chamber and the main cavity.

20. The female coupler according to claim 19, wherein the sealing surface is an annular seal disposed on the piston; and wherein the piston has an internal flow passage through the piston that fluidly connects the trap chamber and the main cavity to enable fluid flow from the trap chamber to the main cavity when the check valve is activated, thereby enabling a decrease of the pressure in the trap chamber.

* * * * *